United States Patent
Kume et al.

(10) Patent No.: US 10,722,960 B2
(45) Date of Patent: Jul. 28, 2020

(54) CUTTING DEVICE

(71) Applicant: MAKITA CORPORATION, Anjo-shi, Aichi (JP)

(72) Inventors: Sho Kume, Anjo (JP); Hirotomo Inayoshi, Anjo (JP); Tatsuo Nakashima, Anjo (JP); Tsutomu Naito, Anjo (JP); Kenji Nose, Anjo (JP)

(73) Assignee: MAKITA CORPORATION, Anjo (JP)

( * ) Notice: Subject to any disclaimer, the term of this patent is extended or adjusted under 35 U.S.C. 154(b) by 93 days.

(21) Appl. No.: 15/899,398

(22) Filed: Feb. 20, 2018

(65) Prior Publication Data

US 2018/0236574 A1 Aug. 23, 2018

(30) Foreign Application Priority Data

Feb. 22, 2017 (JP) ................ 2017-030978
Jul. 21, 2017 (JP) ................ 2017-141652

(51) Int. Cl.
  *B23D 59/00* (2006.01)
  *B23Q 11/00* (2006.01)

(52) U.S. Cl.
  CPC ........ *B23D 59/006* (2013.01); *B23Q 11/0046* (2013.01); *B23Q 11/0071* (2013.01)

(58) Field of Classification Search
  CPC .............. B23D 59/006; B23Q 11/0071; B23Q 11/0046
  USPC ......................................... 30/123, 124, 388
  See application file for complete search history.

(56) References Cited

U.S. PATENT DOCUMENTS

| | | | | |
|---|---|---|---|---|
| 2,562,396 A | * | 7/1951 | Schutz | B23D 59/006 83/478 |
| 4,022,182 A | * | 5/1977 | Lenkevich | B23D 59/002 125/13.01 |
| 4,406,064 A | * | 9/1983 | Goss | B27B 9/00 30/298.4 |
| 4,414,743 A | * | 11/1983 | Pioch | B23D 59/006 30/124 |
| 5,327,649 A | * | 7/1994 | Skinner | B23D 59/006 30/124 |
| 5,774,992 A | * | 7/1998 | Lindenmuth | B23D 59/006 30/124 |
| 5,850,697 A | * | 12/1998 | Welch | B27G 19/04 30/391 |
| 5,850,698 A | * | 12/1998 | Hurn | B23D 47/126 30/391 |

(Continued)

FOREIGN PATENT DOCUMENTS

| | | |
|---|---|---|
| EP | 2500125 A1 | 9/2012 |
| JP | 2003-089101 A | 3/2003 |

(Continued)

*Primary Examiner* — Hwei-Siu C Payer
(74) *Attorney, Agent, or Firm* — Oliff PLC

(57) ABSTRACT

A dust collection nozzle extends from the front of a fixing cover parallel to a base below an upper end of an electric motor. Heavy and large cutting dust can be immediately collected from an area relatively close to a cutting position of a portable cutting device cutting a workpiece immediately after dust is generated due to the cutting, which can in turn improve dust collection efficiency of a dust collection device to which the dust collection nozzle is attached.

12 Claims, 25 Drawing Sheets

(56) References Cited

U.S. PATENT DOCUMENTS

| | | | | |
|---|---|---|---|---|
| 6,167,626 | B1* | 1/2001 | Doumani | B23D 59/006 |
| | | | | 30/124 |
| 6,219,922 | B1* | 4/2001 | Campbell | B23D 59/006 |
| | | | | 30/124 |
| 7,020,970 | B1* | 4/2006 | Welch | B27G 19/04 |
| | | | | 30/391 |
| 9,073,228 | B2 | 7/2015 | Inayoshi et al. | |
| 10,220,457 | B2* | 3/2019 | Kume | B23D 45/16 |
| 2011/0088267 | A1* | 4/2011 | Wikle | B23D 47/126 |
| | | | | 30/388 |
| 2018/0236574 | A1* | 8/2018 | Kume | B23D 59/006 |

FOREIGN PATENT DOCUMENTS

| | | |
|---|---|---|
| JP | 2004-195566 A | 7/2004 |
| JP | 2005-153058 A | 6/2005 |
| JP | 2010-036316 A | 2/2010 |
| JP | 2011-101929 A | 5/2011 |
| JP | 2011-183465 A | 9/2011 |

\* cited by examiner

CUTTING DEVICE

CROSS-REFERENCE

This application claims priority to Japanese patent application serial number 2017-30978, filed on Feb. 22, 2017, and to Japanese patent application serial number 2017-141652, filed on Jul. 21, 2017, where the contents of both applications are incorporated herein by reference in their entirety.

TECHNICAL FIELD

The present disclosure generally relates to a portable cutting device that performs a cutting task by rotating a circular cutting blade that is driven by an electric motor as a power source.

BACKGROUND ART

Some types of portable cutting devices developed in the past are suitable for performing a cutting task in such a manner that a user cuts an underfoot workpiece while standing or stooping down. Japanese Laid-Open Patent Publication No. 2003-89101 discloses a cutting device that is mainly intended to be used while the user is standing. To accomplish this purpose, in the cutting device disclosed in this patent document, a D-shaped handle that the user holds is arranged at a position far away from a rotary cutting blade (cutting position) in the rearward direction, extending rearward from a rear end of the base of the cutting device. Japanese Laid-Open Patent Publication No. 2011-183465 discloses a relatively small cutting device having a bar-shaped handle disposed away from a rotary cutting blade in the rearward direction that comprises a nozzle for collecting dust that is generated while a cutting task is performed.

Recently, strong awareness with regard to establishing a safe working environment has been increased. Under this circumstance, the need to take sufficient dustproof measures has increased with regard to a user's hand with which the user holds a cutting device handle.

Thus, as a result of the mentioned deficiencies in the art, there is a need in the art to take dustproof measures with regard to the user's hand without impairing operability.

SUMMARY

In one exemplary embodiment of the present disclosure, a portable cutting device includes a base with which a material to be cut is brought into contact and a cutting device main body that is supported on an upper surface side of the base. Furthermore, the cutting device main body includes an electric motor, a rotary cutting blade that is driven by the electric motor, a fixing cover that covers the rotary cutting blade above an upper surface side of the base, and a handle that a user holds. Furthermore, the handle includes a holding portion extending in an up-to-down direction, and each of an upper and a lower part of the holding portion is connected to the cutting device main body, collectively forming a loop shape, with a hole in the loop interior. Furthermore, the holding portion is configured to be positioned behind a rear end of the base when a cutting depth of the rotary cutting blade is set to an maximum, and a dust collection nozzle for connecting a dust collection device is provided on an upper surface side of the base.

According to the embodiment, the device is structurally configured so that cutting dust is not accumulated in the user's hand. Furthermore, the dust collection device and the dust collection nozzle for connecting the dust collection device do not hinder the user's hand. In this respect, operability of this device in comparison to a conventional device is improved. A dust collector, a dust collection bag and a dust collection box etc. can be used as the dust collection device that is connected to the dust collection nozzle.

In another exemplary embodiment of the disclosure, the dust collection nozzle is disposed at the front of the fixing cover.

According to such an embodiment, cutting dust generated by a cutting task can be immediately collected just after it is blown out on an upper surface side of the base. In this respect, high dust collection efficiency can be obtained.

In another exemplary embodiment of the disclosure, the dust collection nozzle is disposed on the same side as the electric motor widthwise relative to the rotary cutting blade.

According to such an embodiment, even in the case where the cutting device main body is tilted with respect to the base to perform an oblique cutting task, a tilting angle of the cutting device main body is not limited by the presence of the dust collection nozzle. In other words, a large tilting angle in a direction opposite toward the dust collection nozzle can be obtained. In this respect, even when performing such an oblique cutting task, due to the large tilting angle, operability of the cutting device is not impaired.

In another exemplary embodiment of the disclosure, the dust collection nozzle is integrally formed with the fixing cover.

According to such an embodiment, the number of components is reduced and thus the durability of the dust collection nozzle can be improved.

In another exemplary embodiment of the disclosure, a rib for directing cutting dust toward the dust collection nozzle is provided in the interior of the fixing cover.

According to such an embodiment, dust collection efficiency of the dust collection nozzle is improved by the presence of the rib.

In another exemplary embodiment of the disclosure, the dust collection nozzle is located below an upper end of the electric motor and extends parallel to the base.

According to such an embodiment, the dust collection nozzle is proximate to the cutting position and thus after generation of the cutting dust, including relatively heavy and large cutting dust, said dust can be immediately collected. Furthermore, the dust collection nozzle extends in parallel with the base and thus cutting dust once collected may not drop and return to the side of the cutting position. In this respect, dust collection efficiency can be improved.

In another exemplary embodiment of the disclosure, the dust collection nozzle extends in a direction perpendicular to the rotary cutting blade.

According to such an embodiment, a hose connected to the dust collection nozzle can be pulled out in a direction perpendicular to the rotary cutting blade. Thus, when an operation of the cutting device is performed, the hose position can be easily manipulated without any interference in the operation of the cutting device.

In another exemplary embodiment of the disclosure, the dust collection nozzle has a crank shape including a lower portion, an extension portion, and an upper portion. The lower portion extends from a lower region of the fixing cover parallel to the base, and the extension portion extends from an end of the lower portion in the up-to-down direction. Furthermore, the upper portion extends from an upper region of the extension portion parallel to the base.

According to such an embodiment, since the dust collection nozzle has a crank shape, relatively heavy and large cutting dust can be collected in an area close to the lower portion and can then be directed to the upper portion, where the hose may be easily connected to the dust collection nozzle. Thus, due to the structural configuration of the dust collection nozzle the hose position can be easily and advantageously manipulated so as not to interfere with the cutting task and at the same time dust collection efficiency can be improved.

In another exemplary embodiment of the disclosure, the dust collection nozzle extends from an upper portion of the fixing cover in a direction perpendicular to the rotary cutting blade.

According to such an embodiment, cutting dust can be discharged in an upper area where relatively light and small cutting dust is easily blown out and the hose for the dust collector can be easily connected. Furthermore, the hose can be pulled out in a direction perpendicular to the rotary cutting blade and thus the hose position can be easily manipulated so as not to interfere with the cutting task.

In another exemplary embodiment of the disclosure, the dust collection nozzle extends from a rear portion of the fixing cover further in a rearward direction.

According to such an embodiment, the hose for the dust collector can be pulled out in the rearward direction. Thus, the hose position can be manipulated so as not to interfere with the cutting task.

In another exemplary embodiment of the disclosure, the dust collection nozzle extends from the front of the fixing cover in an upward direction.

According to such an embodiment, immediately after being generated, cutting dust can be efficiently collected above the cutting position, and thus dust collection efficiency can be improved.

DETAILED DESCRIPTION

The detailed description set forth below, when considered with the appended drawings, is intended to be a description of exemplary embodiments of the present invention and is not intended to be restrictive and/or to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, these specific details refer to well-known structures, components and/or devices that are shown in block diagram form in order to avoid obscuring significant aspects of the exemplary embodiments presented herein.

Figure 1:
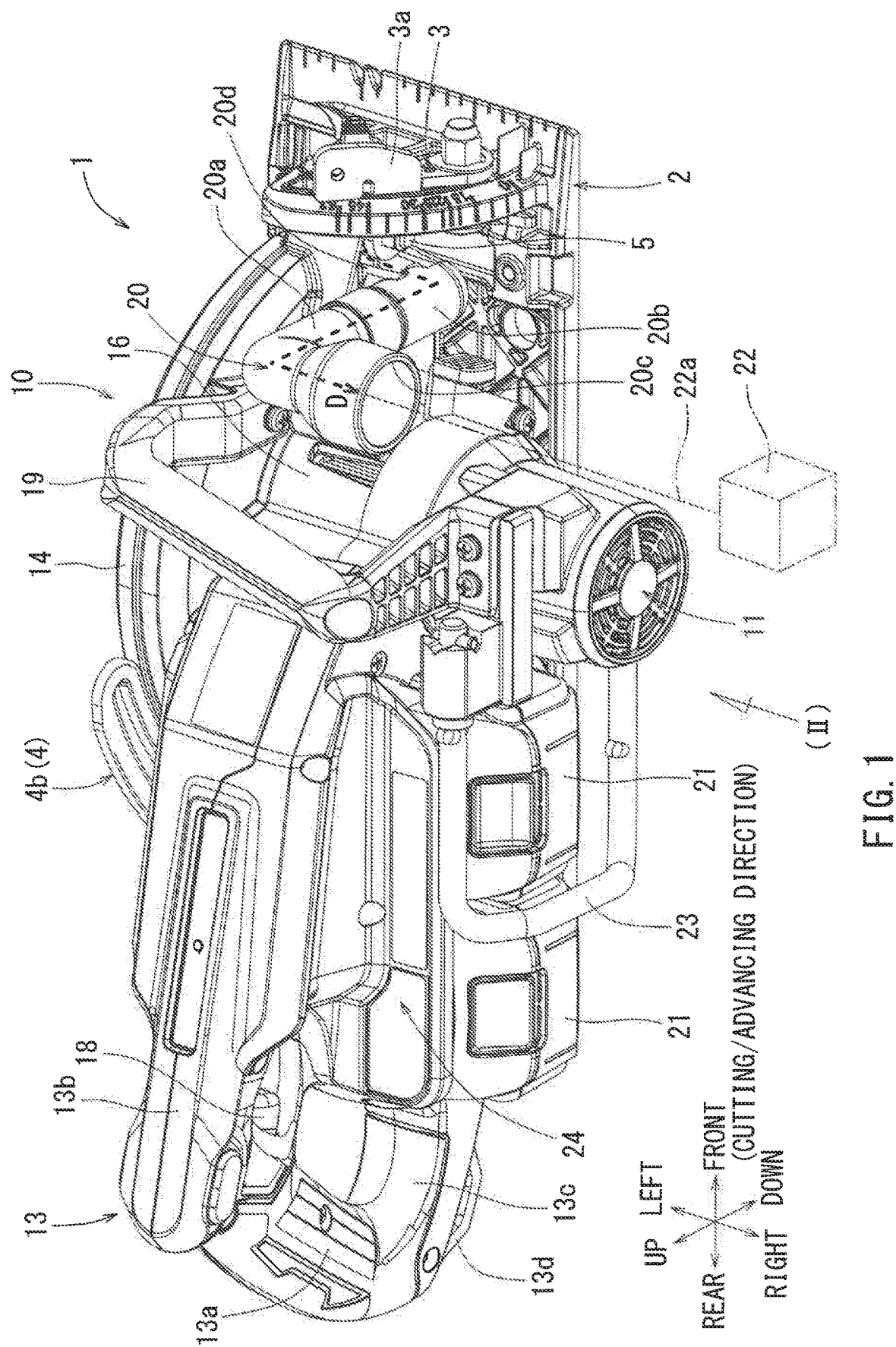
FIG. 1 is an overall perspective view of a cutting device according to an exemplary embodiment (first embodiment) of the present disclosure, viewed from a side of an electric motor (a right side).
Figure 2:
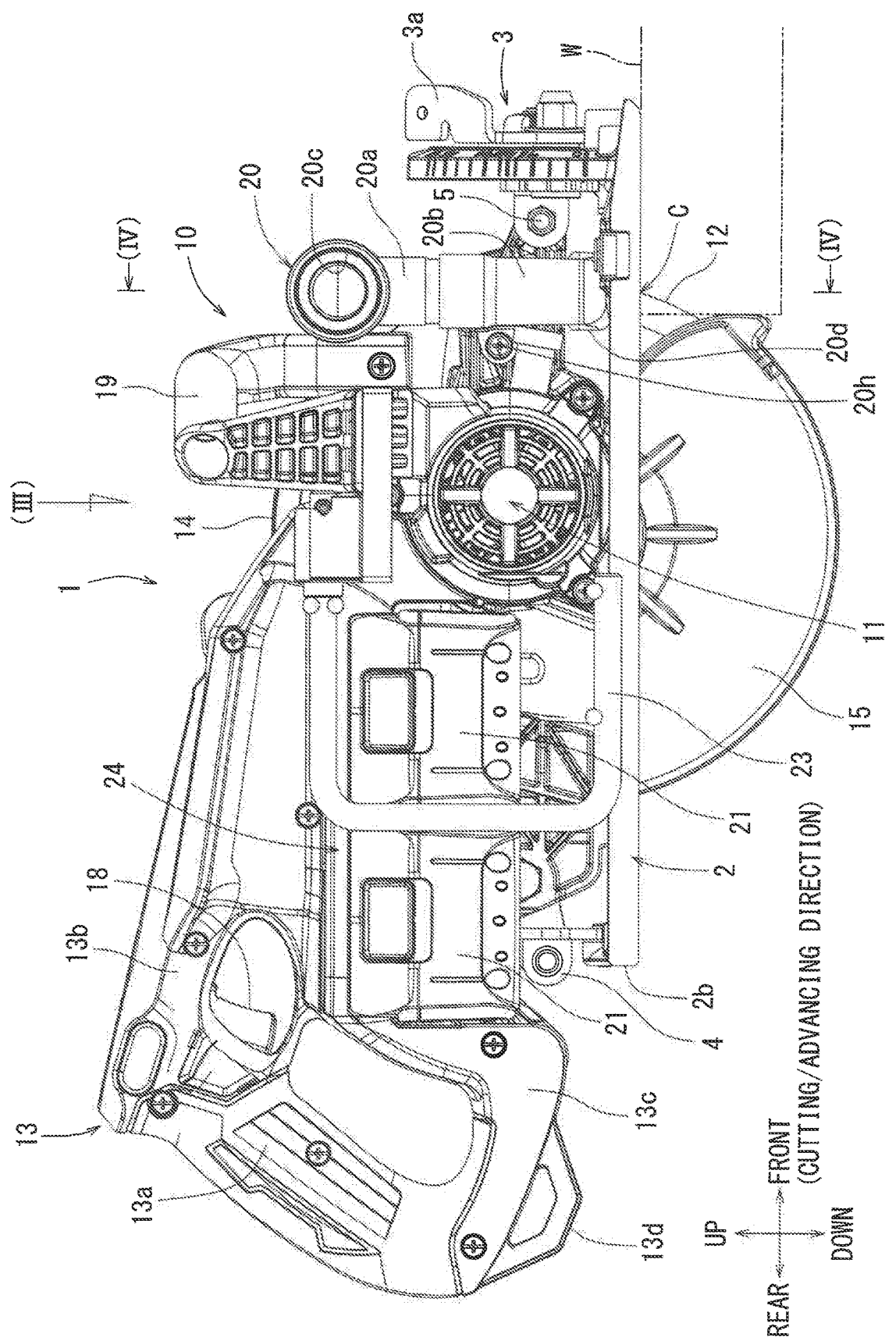
FIG. 2 is a side view of the cutting device according to the exemplary embodiment (first embodiment), viewed from an arrow (II) of FIG. 1 (from the side of the electric motor).
Figure 3:
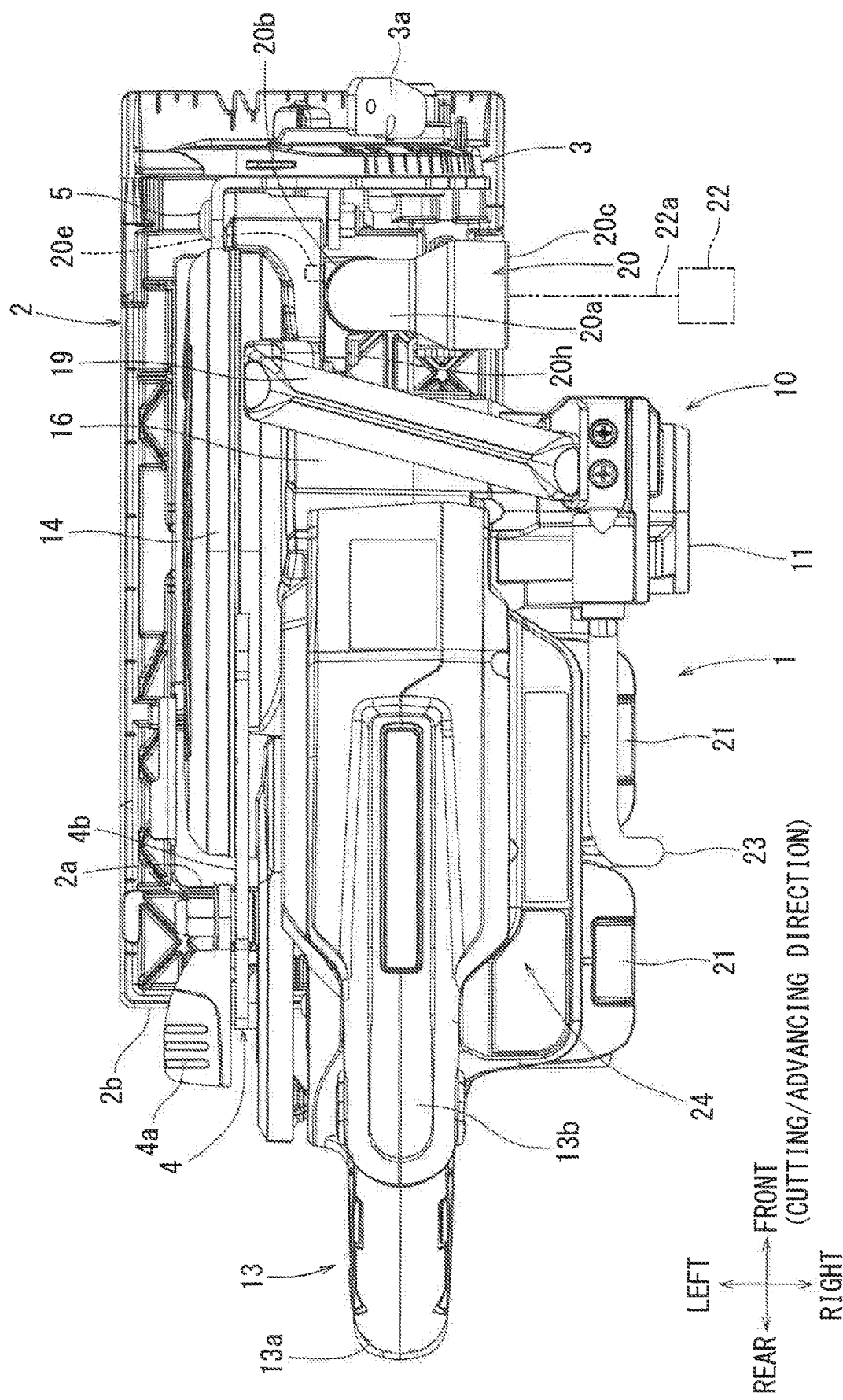
FIG. 3 is a plan view of the cutting device according to the exemplary embodiment (first embodiment), viewed from an arrow (III) of FIG. 2.

Representative, non-limiting embodiments according to the present disclosures will be described with reference to FIGS. 1 to 26. As shown in the figures, one example of a cutting device 1 will be exemplified in each of embodiments. As shown in FIGS. 1 to 3, the cutting device 1 of an exemplary embodiment (first embodiment) may include a rectangular flat plate-shaped base 2 on which a material to be cut (workpiece) W is placed, and also include a cutting device main body 10. The cutting device main body 10 may be supported on an upper surface side of the base 2. The cutting main body 10 may be provided with a circular rotary cutting blade 12 (circular saw blade) that is rotated by an electric motor (brushless motor) 11 as a drive source. The circular rotary cutting blade 12 may include a saw blade mainly used for cutting wooden material, or alternatively a diamond wheel or a grindstone used for cutting solid material such as a stone or concrete structure, etc. Based on the cutting material to be cut, the appropriate cutting blade 12 can be selected for performing a particular cutting task. A lower portion of the rotary cutting blade 12 may protrude from a lower surface of the base 2 through a window 2a provided in the base 2. For the purposes of performing the cutting task, the rotary cutting blade 12 protruding from the lower surface of the base 2 may cut into a workpiece W.

The cutting main body 10 may be provided with a handle 13 that the user holds. When performing the cutting task, the user stands on the rear side of the cutting device 1 (relative to the figure as shown in FIGS. 1 to 3), holding the handle 13 with, for example, their right hand, and moves the cutting device 1 forward to the front side (relative to the figure as shown in FIGS. 1 to 3), so that the cutting task may be performed. In the following embodiments, the front and rear directions of members and configurations are based relative to the cutting/advancing direction described above. In particular, the cutting/advancing direction corresponds to the front, and the position of the user corresponds to the rear of the cutting device 1. Furthermore, the leftward and the rightward are based on the user's position.

The cutting device main body 10 may be provided with a metal-made fixing cover 14 that covers a substantially half circumference of an upper portion of the rotary cutting blade 12 corresponding to an upper semicircle in the up-to-down rear-to-front plane proximal to the leftmost side of base 2. The cutting device main body 10 may be supported on the upper surface of the base 2 via a front support 3 and a rear support 4. The front support 3 and the rear support 4 may be configured such that the cutting main body 10 can be tilted to the right about base 2 at a range of angles up to approximately 50°. Though not clearly shown in the figures, both the front support 3 and the rear support 4 may be provided with a left-to-right tilt support shaft, where both shafts are coaxially disposed with respect to each other, and face opposite to each other in the front-to-rear direction. The cutting device main body 10 may be supported so as to be tilted in the left-to-right direction about base 2 via said front and rear left-to-right tilt support shafts. The cutting body main body 10 may be tilted to the right side by loosening a fixing lever 3a. By tilting the cutting device main body 10 to the right side, a so-called oblique cutting operation can be performed where a cut end is tilted (in the rightward direction) with respect to the lower surface of the base 2.

Furthermore, the front support 3 and the rear support 4 may be configured to swing the cutting device main body 10 in the up-to-down direction via an up-to-down swing support shaft 5. By changing an up-to-down swing position of the cutting device main body 10 with respect to the base 2, the protruding length of the rotary cutting blade 12 below the lower surface of the base 2 can be changed. Because of this changeable configuration, a cutting depth of the rotary cutting blade 12 with regard to the workpiece W can be adjusted as desired. FIG. 2 shows the case where the cutting depth is adjusted to its maximum depth. The rear support 4 may be provided with a depth guide 4b for adjusting the cutting depth. By loosening the fixing lever 4a, the up-to-down swing position of the cutting device main body 10 about the up-to-down swing support shaft 5, as well as the cutting depth, can be adjusted.

A movable cover 15 may cover a substantially half circumference of a lower portion of the rotary cutting blade 12, corresponding to a lower semicircle in the up-to-down rear-to-front plane proximal to the leftmost side of base 2. The movable cover 15 may be supported so as to be opened and closed along the periphery of the rotary cutting blade 12. When the movable cover 15 is opened, a cutting edge of the rotary cutting blade 12 may be exposed to the outside. The movable cover 15 may be spring-biased in a closing direction. When the movable cover 15 is closed by the spring-biased force, the substantially half circumference of the lower portion of the rotary cutting blade 12 may be covered by the movable cover 15. Generally, during the cutting task, a front end of the movable cover 15 may be brought into contact with an end of the workpiece W as shown in FIG. 2, and as the cutting device 1 is moved in the forward direction while the movable cover 15 is being brought into contact with the end of the workpiece W, the movable cover 15 may be gradually opened by the force of the workpiece W pushing the cover 15 in the opposite circumferential direction to the spring-biased force, against said spring-biased force. In the alternative, the movable cover 15 can also be forced to be opened and closed by a manual operation.

The electric motor 11 may be attached to a right side surface of the fixing cover 14 via a reduction gear 16. The electric motor 11 may be attached in such a manner that an axis of the motor (hereinafter referred to as "output axis", in the left-to-right direction when not tilted) is perpendicular to the surface of the rotary cutting blade 12. The reduction gear 16 may be configured such that a reduction gear train is housed in a gear housing that is integrally formed on the right side surface of the fixing cover 14. The gear housing may be formed integrally with the fixing cover 14 such that both components are made of metal. The electric motor 11 with a motor housing may be screw-connected to the gear housing.

Figure 4:
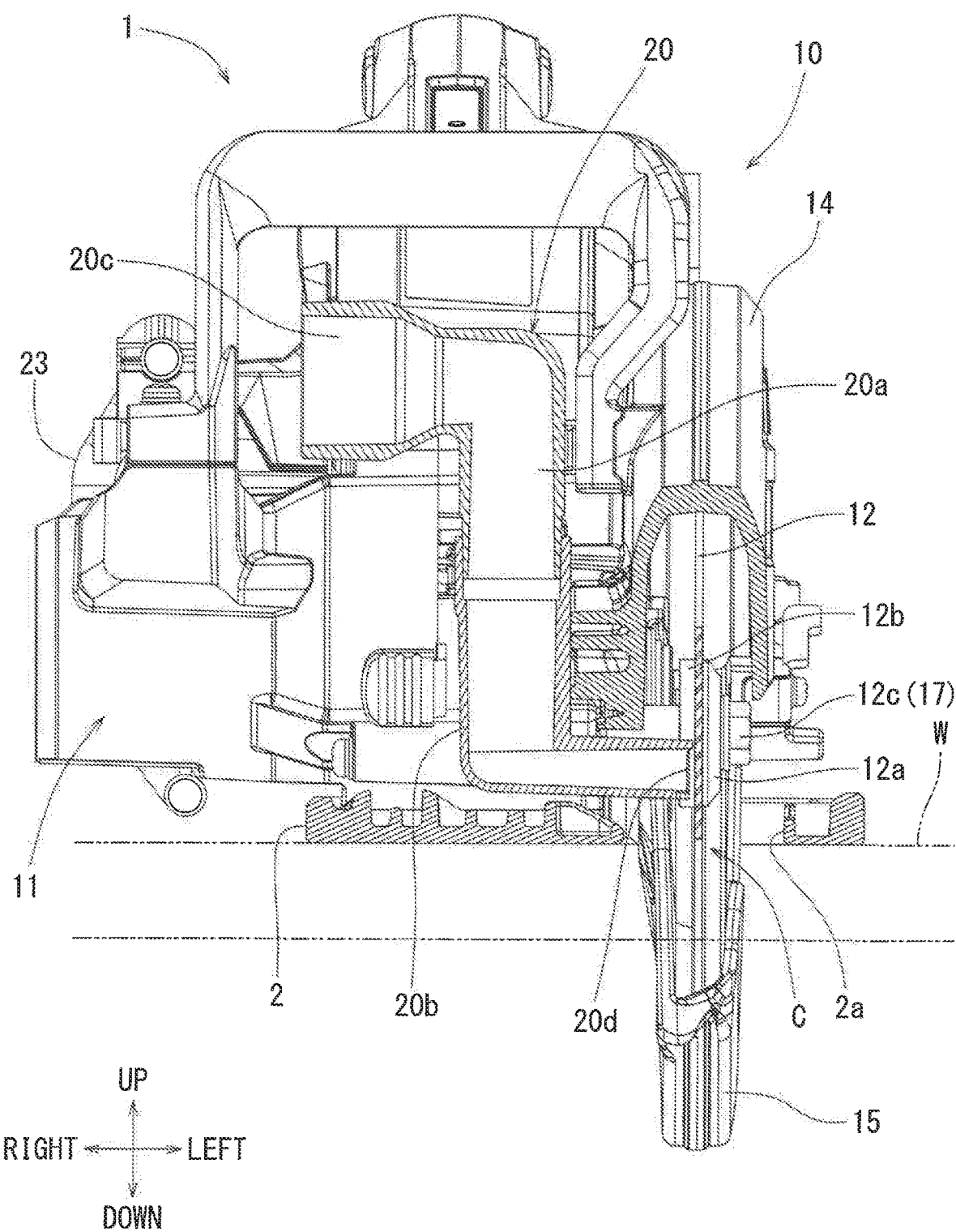
FIG. 4 is a cross-sectional view taken along line (IV)-(IV) of FIG. 2, showing a longitudinal cross section of a dust collection nozzle along a center axis thereof.

A rotation driving force of the electric motor 11 may be transmitted to a spindle 17 via the reduction gear 16. As shown in FIG. 4, a distal end of the spindle 17 may protrude into the interior of the fixing cover 14, and said protruding portion of the spindle 17 may further protrude through and be attached to the rotary cutting blade 12. The rotary cutting blade 12 may be pinched by an outer flange 12a and an inner flange 12b in a direction perpendicular to the circumferential surface plane of the rotary cutting blade 12. By fastening a fixing bolt 12c, which is inserted onto the distal end of the spindle 17, in the rightward direction while the rotary cutting blade 12 is being pinched by the outer flange 12a and the inner flange 12b, the rotary cutting blade 12 can be fixed to the spindle 17 so as not to be displaceable in both the axial and radial directions.

As shown in FIGS. 1 to 3, a battery attachment portion 24 may be provided on the right side of the fixing cover 14, to the rear of the electric motor 11. The battery attachment portion 24 may be formed in approximately a flat plate shape such that two battery packs 21 can be attached to the lower surface thereof in a manner to arrange side by side in the front-to-rear direction. The battery packs 21 may be highly versatile 18V output Lithium-Ion batteries, which can be attached to other electric power tools, e.g. a screw fastener, etc. The battery packs 21 can also be detached from the battery attachment portion 24 and can be charged by a dedicated charger in order to be repeatedly used as a power source. The two battery packs 21 may be electrically connected in a series configuration and thus 36V electric power in total can be supplied to the electric motor 11.

The handle 13 may be arranged on the rear side of the battery attachment portion 24. The handle 13 may have a loop shape, including a holding portion 13a that the user holds with their hand, an upper arm portion 13b, and a lower arm portion 13c. The holding portion 13a may extend in the up-to-down direction. An upper region of the holding portion 13a may be joined to an upper portion of the battery attachment portion 24 via the upper arm portion 13b. Similarly, a lower part of the holding portion 13a may be joined to a rear lower portion of the battery attachment portion 24 via the lower arm portion 13c. Thus, via the upper arm portion 13b as well as the lower arm portion 13c, the holding portion 13a may be attached to the battery attachment portion 24, and eventually to the electric motor 11 and the fixing cover 14 directly or indirectly. Because of this structural configuration in which the components are joined in this manner, high support rigidity (strength) of the holding portion 13a can be obtained.

The handle 13 may extend approximately parallel to the surface of the rotary cutting blade 12 with respect to the up-down rear-front plane, where the plane of the loop shape in these directions, and the circumferential surface plane of the cutting blade in this direction are approximately parallel. The handle 13 may protrude from the rear of the battery attachment portion 24 in the rearward direction. Because of this rearward configuration, the holding portion 13a may be disposed further behind a rear end 2b of the base 2 in a state where the cutting depth is adjusted to the maximum as shown in FIG. 2. Thus, the user can easily and advantageously operate the cutting device 1 even while the user is standing. A trigger-type switch lever 18 may be arranged on the side of an inner circumference of a hole formed within the handle 13, on the lower rear surface of the upper arm portion 13b. By pulling the switch lever 18 with, for example, a fingertip of the hand that the user holds the device with, the electric motor 11 can operate to rotate the rotary cutting blade 12. A damper 13d for absorbing an impact to the handle 13 may be provided on the lower rear surface side of the lower arm portion 13c.

A front handle 19 may be affixed to the upper side of the electric motor 11. As shown in FIGS. 1 to 3, the front handle 19 may have a gate-like shape, straddling and touching the upper surface at the right end of the electric motor 11 at one end of the handle, and touching the surface at a right side of the fixing cover 14 at an opposite end. The user may hold an upper portion of the front handle 19, which extends along the motor axis in the left-to-right direction. The user may hold the front handle 19 with one hand and the holding portion 13a of the handle 13 with their other hand in order to portably carry, as well as operate the cutting device 1, in a stable manner.

A dust collection nozzle 20 may be arranged on the lower front side of the front handle 19 and on the lateral front side of the fixing cover 14. The dust collection nozzle 20 may have a function of connecting a dust collection device 22 for collecting cutting dust that is generated at a cutting position C by the cutting task. By using this dust collection nozzle 20, the cutting device 1 can add a new feature of utilization in collecting said dust.

Figure 5:
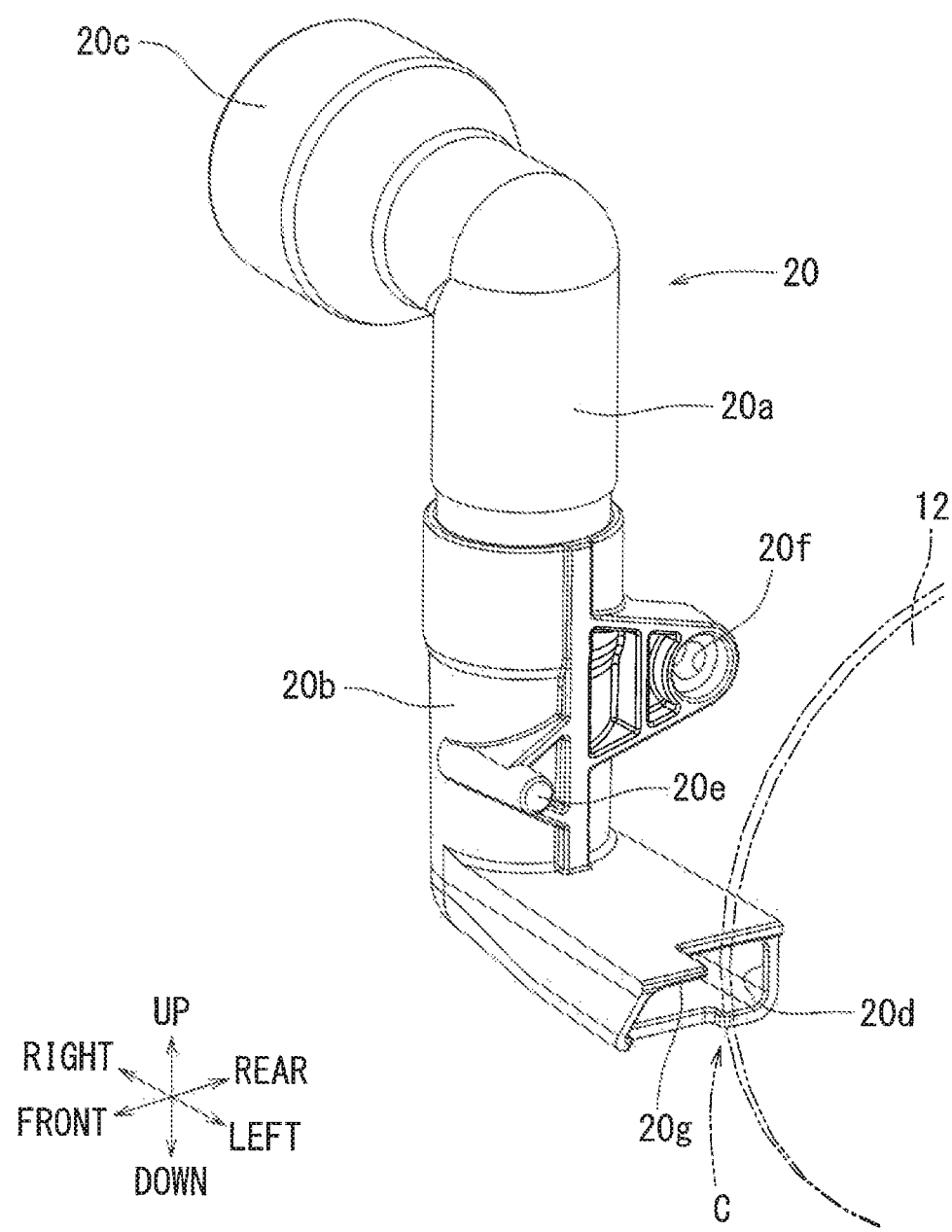
FIG. 5 is a perspective view of the dust collection nozzle according to the exemplary embodiment (first embodiment).

FIG. 5 shows the dust collection nozzle 20 as one unit, which is removed from the cutting device 1. The dust collection nozzle 20 may have a crank shape, including a lower portion, an extension portion and an upper portion. The lower portion may extend from the right side of the front region of the fixing cover 14 near the cutting position C in a direction parallel to the base 2. The extension portion may extend in the upward direction from the rightmost end of the lower portion. The upper portion may extend from the uppermost end of the extension portion, in a direction parallel to base 2, and facing opposite and parallel to the extension direction of the lower portion. In the present embodiment (first embodiment), the dust collection nozzle 20 may have a double-stage connection structure including an upper duct portion 20a and a lower duct portion 20b. Both of the upper duct portion 20a and the lower duct portion 20b may be bent in an L shaped configuration. A connection port 20c that forms a hollowed tubular opening in the lateral direction may be provided on an upper part of the upper duct portion 20a. Furthermore, a rectangular prismatic dust collection port 20d that is hollow and open in the lateral direction may be provided in a lower part of the lower duct portion 20b. The dust collection port 20d of the lower duct portion 20b may correspond to the aforementioned lower portion of the nozzle that extends from near the cutting position C parallel to the base 2. Furthermore, the connection port 20c of the upper duct portion 20a may correspond to the aforementioned upper portion of the nozzle that extends from the uppermost end of the extension portion parallel to the base 2. Accordingly, a combined portion of the upper duct portion 20a extending in the up-to-down direction with the lower duct portion 20b extending in the up-to-down direction, where the upper duct portion 20a forms an upside down L shape and the lower duct portion 20b forms an L shape facing opposite laterally from the upper duct portion 20a, where the lower end of the upper duct portion 20a is concentrically smaller and fits into the upper end of the lower duct portion 20b, where the region connecting these two components may correspond to the extension portion. An opening direction of the connection port 20c with regard to the dust collection port 20d can then be changed by turning a connecting direction of the upper duct portion 20a in the right-left front-rear plane about the concentric axis at its radial center, with respect to the lower duct portion 20b. A protrusion 20e for positioning the lower duct portion 20b and an attachment hole 20f for fastening a screw may be provided in the lower duct portion 20b.

As shown in FIGS. 3 to 5, the dust collection nozzle 20 may be attached to the cutting device 1 in an erected state by inserting the protrusion 20e for positioning the lower duct portion 20b into a positioning hole provided in the front of the fixing cover 14 and by fastening a fixing screw 20h through the attachment hole 20f, into the front of the fixing cover 14. In this attached state, the dust collection port 20d may be directed toward the cutting position C via a gap (observation window) between the lower end of the fixing cover 14 and the upper surface of the base 2. The cutting position C may be the location where the rotary cutting blade 12 intersects a tip portion of the workpiece W, and cutting dust may be blown out from the cutting position C in the upward direction by the rotation of the rotary cutting blade 12 at the point of intersection. The dust collection port 20d may be positioned in the vicinity of the cutting position C from where the cutting dust is blown out. As shown in FIG. 5, a projection portion 20g projecting to the cutting edge of the rotary cutting blade 12 in the forward direction may be provided on the front left side of the dust collection port 20d. Dust collection efficiency of the dust collection port 20d can be furthermore increased by the projection portion 20g, due to increase proximity and greater dust capture because of its presence.

As shown in FIG. 1, a dust collection device 22 can be connected to the connection port 20c of the dust collection nozzle 20 via a connection hose 22a. A dust collection bag or a dust collection box, each of which can be simiply and easily used, may be used as the dust collection device 22. In either case, the dust collection device 22 can be connected to the connection port 20c along with a dust collector that can forcibly collect cutting dust using electric power. FIG. 1 shows a thick broken line path with an arrow D, depicting the flow of cutting dust from the cutting position C to the dust collection port 20d of the dust collection nozzle 20, and through the dust collection nozzle 20.

A large-sized hook 23 may be provided on the right side of the battery attachment portion 24. The hook 23 may rotate in the up-down left-right plane about a fixed rear-front end of the hook 23, where the front portion of said end is adjacent to the right end of front handle 19 (see FIG. 1). The hook 23 may rotate in this manner such that it can be held in the up/down oriented position. By rotating in the upward direction, the hook 23 may have a function of hooking the cutting device 1 on, and suspending the cutting device 1 from, for example, an end portion of a stepladder or a workbench. Alternatively, by rotating in the downward direction, as shown in FIGS. 1 to 4, the hook 23 may function as a guard for the battery packs 21.

According to the cutting device 1 of the present embodiment (first embodiment) as discussed above, the handle 13 of the cutting device 1 may project largely in the rearward direction where the holding portion 13a of the handle 13 that the user holds may be disposed at its furthest point behind the rear end 2b of the base 2 when the cutting depth is adjusted to its maximum. Because of this configuration, the user can easily and advantageously operate the cutting device 1 while standing, and at the same time, dust collection efficiency can be improved. By improving dust collection efficiency with this type of cutting device 1, a safer working environment can be established.

Furthermore, according to the dust collection nozzle 20 of the present embodiment (first embodiment), the end of hollowed dust collection port 20d is open in the vicinity of and immediately proximate to the cutting position C. Because of this configuration, immediately after cutting dust is generated, it can be collected by the dust collection port 20d, and thus high dust collection efficiency can be obtained.

Furthermore, the dust collection nozzle 20 of the present embodiment (first embodiment) may be configured to be attached to the right side of the fixing cover 14 as well as the electric motor 11 with regard to the width direction of the rotary cutting blade 12 (the left-to-right direction). Because of this attachment configuration, the added (newly-attached) dust collection nozzle 20 does not interfere with a tilting operation of the cutting device main body 10 in the leftward direction. Furthermore, the dust collection nozzle 20 does not limit the tilting angle of the cutting device main body 10. In this respect, the secured attachment configuration of dust collection nozzle 20 prevents it from interfering or impairing the oblique cutting function of the cutting device 1.

The present embodiment (first embodiment) discussed above may be further modified without departing from the scope and sprit of the present teachings. In the above-discussed embodiment, the dust collection nozzle 20 is screw-fixed to the front of the fixing cover 14. Instead, the dust collection nozzle 20 may be screw-fixed to the upper surface of the base 2 or any other parts of the cutting device main body 1.

Furthermore, in the above-discussed embodiment, the double-stage interlocking connection structure of the dust collection nozzle 20 is exemplified. Instead, an integrally formed dust collection nozzle may be used, where the nozzle is integrally formed from the dust collection port to the connection port and which has a crank shape configured such that the upper and the lower of the extension portion may not be rotated with respect to each other.

Figure 6:
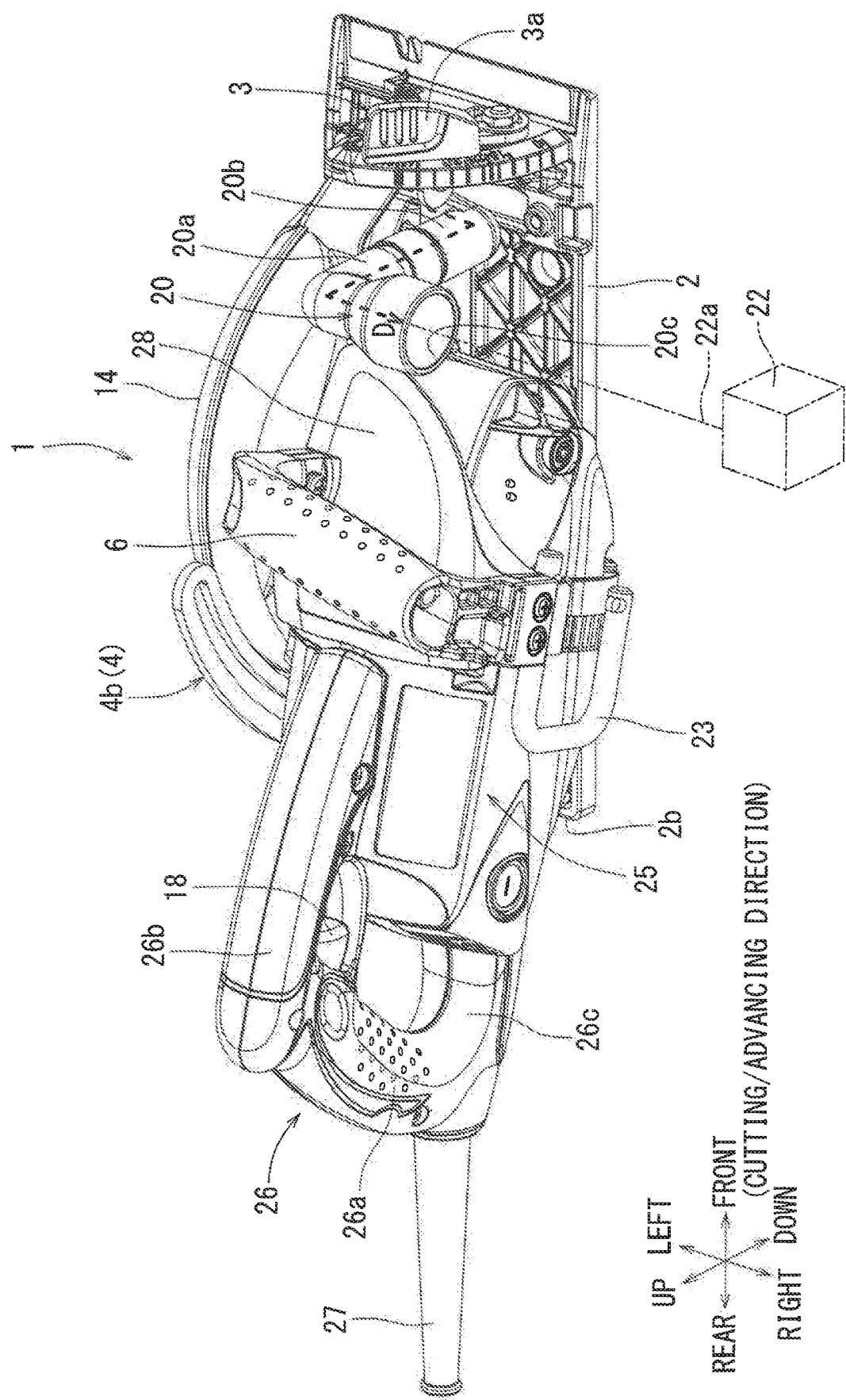
FIG. 6 is an overall perspective view of the cutting device according to another exemplary embodiment (second embodiment).
Figure 7:
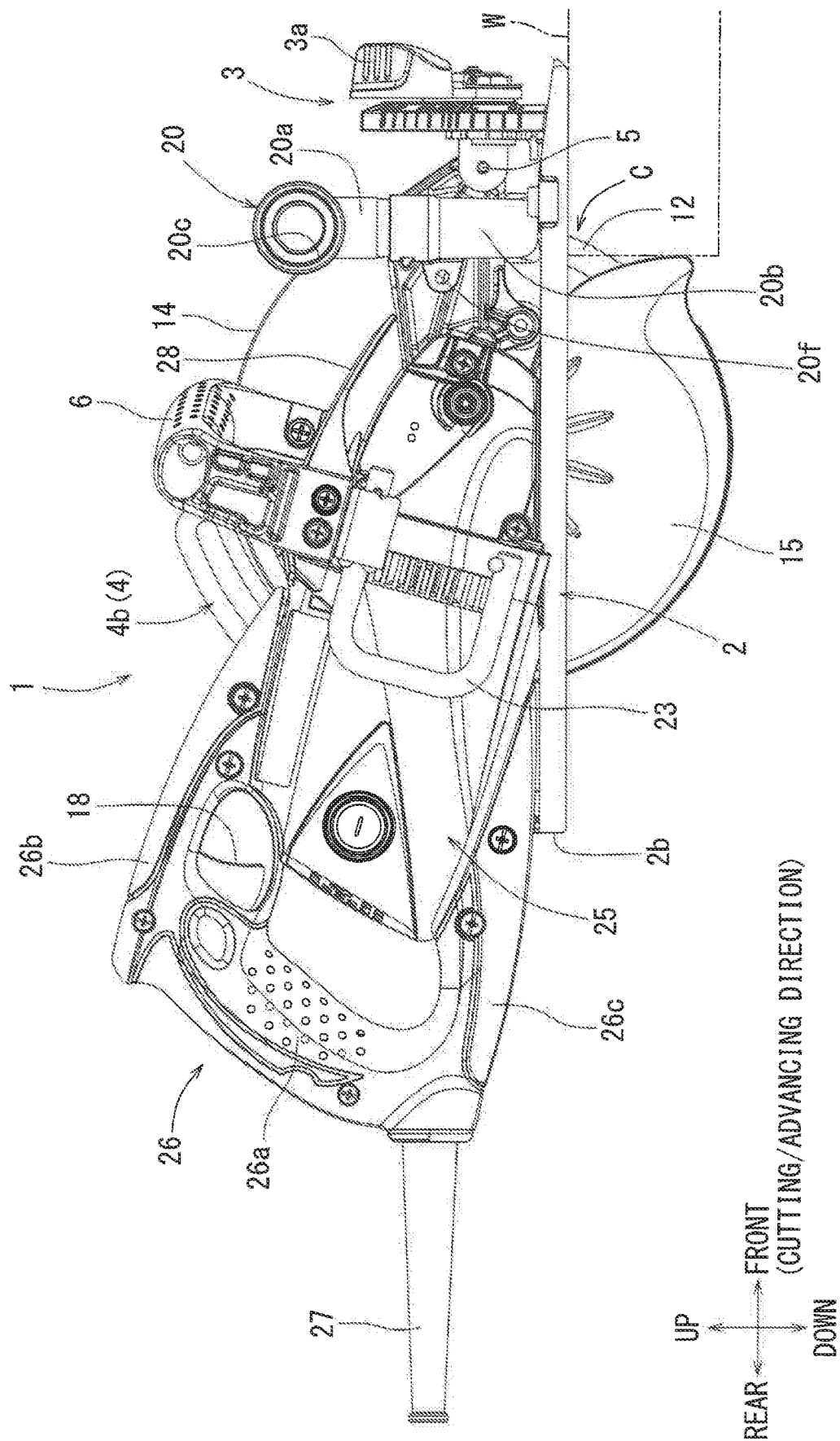
FIG. 7 is a side view of the cutting device according the second embodiment.
Figure 8:
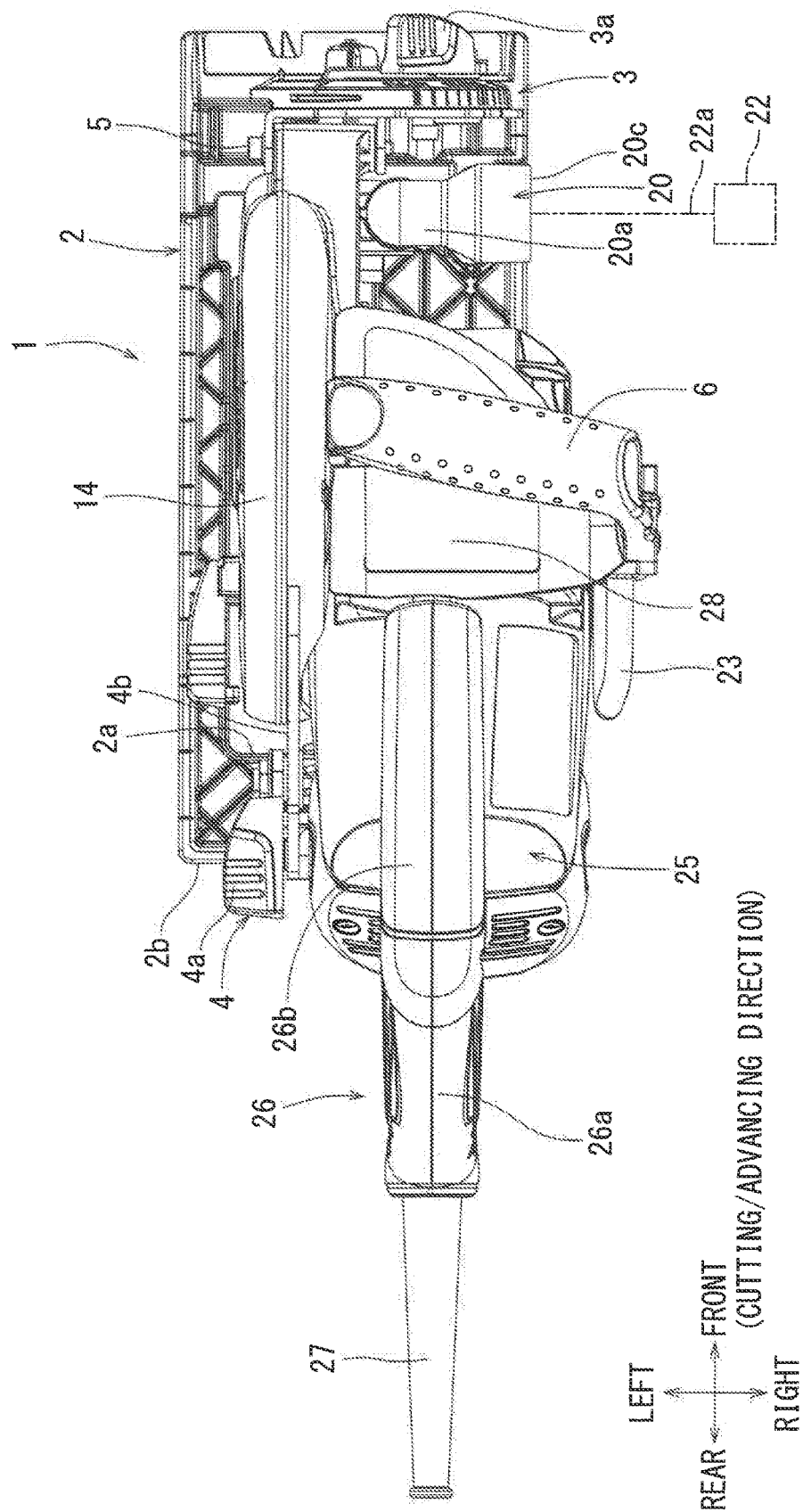
FIG. 8 is a plan view of the cutting device according to the second embodiment.

Furthermore, in the above-discussed embodiment, the rechargeable cutting device 1, to which the two battery packs 21 can be attached as the power source, is exemplified. Instead, the dust collection nozzle 20 can be applied to a cutting device operated by AC power. In said cutting device operated by AC power, the space that was used in the previous embodiment for attaching the battery packs 21 can be omitted. For example, as shown in FIGS. 6 to 8, the above-exemplified dust collection nozzle 20 can be applied to a cutting device of another embodiment (second embodiment) in which an electric motor 25 (motor with brush) is attached in a different direction from the electric motor 11 in the first embodiment. In the first embodiment, the electric motor 11 is attached to the cutting device 1 such that the rotation axis of the rotary cutting blade 12 (rotation axis of the spindle 17) is arranged in parallel with the motor axis. However, in the second embodiment shown in FIGS. 6 to 8, the electric motor 25 may be attached to the cutting device 1 such that the motor axis extends along the surface of the rotary cutting blade 12 (in a longitudinal rather than perpendicular direction).

Descriptions of the members and configurations in common with the first embodiment may be omitted by using the same reference numerals. In the cutting device 1 of the second embodiment, the electric motor 25 may be attached to the cutting device 1 via a reduction gear that converts the output of the motor along the longitudinal axis to a perpendicular direction by use of Hypoid gear (a registered trademark of Gleason Corporation). In the second embodiment, the electric motor 25 may be attached to the cutting device 25 such that the motor axis extends in the rearward direction (in the longitudinal direction) along the surface of the rotary cutting blade 12 (in the front-to-rear direction). Because of this configuration, in the second embodiment, a front handle 6 may intersect the motor axis in front of the electric motor 25. Furthermore, in the second embodiment, a flat plate-shaped deflection plate 28 may be provided below the front handle 6 and at the upper front of the electric motor 25. The deflection plate 28 may prevent a flow of air that cools the electric motor 25 from scattering and escaping in the upward direction and may instead confine and deflect the air inwards to also cool the gear housing.

In the second embodiment, the upper holding portion 26a of the handle 26 may be joined to the upper surface side of the electric motor 25 via an upper arm portion 26b. The lower holding portion 26a may be joined to the lower surface side of the electric motor 25 via a lower arm portion 26c. A power cord 27 may be pulled out from the rear of the lower arm portion 26c, or from the lower holding portion 26a. The dust collection nozzle 20 can be applied to the AC-driven cutting device 1 in which the electric motor 25 may be provided such that the motor axis extends in parallel with the surface of the rotary cutting device 12. FIG. 6, which shows the second embodiment, shows a thick broken line with an arrow D, depicting the flow of cutting dust that flows from the cutting position C through the dust collection nozzle 20 and to the connection port 20c at the end of said nozzle.

The first and second embodiments may be further modified without departing from the scope and sprit of the present teachings. In the above-discussed embodiments, the dust collection port 20d is attached to the front side of the fixing cover 14 and the dust collection port 20d is configured to be disposed in the immediate vicinity of the cutting position C. However, the position where the dust collection port is located (the dust collection position) can be modified. FIGS. 9 to 13 show dust collection nozzles 30 and 31, each of which is attached to a different position from that in the first and second embodiments. Furthermore, although a hypoid gear is used as a reduction gear in the second embodiment, a worm gear may also be used alternatively.

Figure 9:
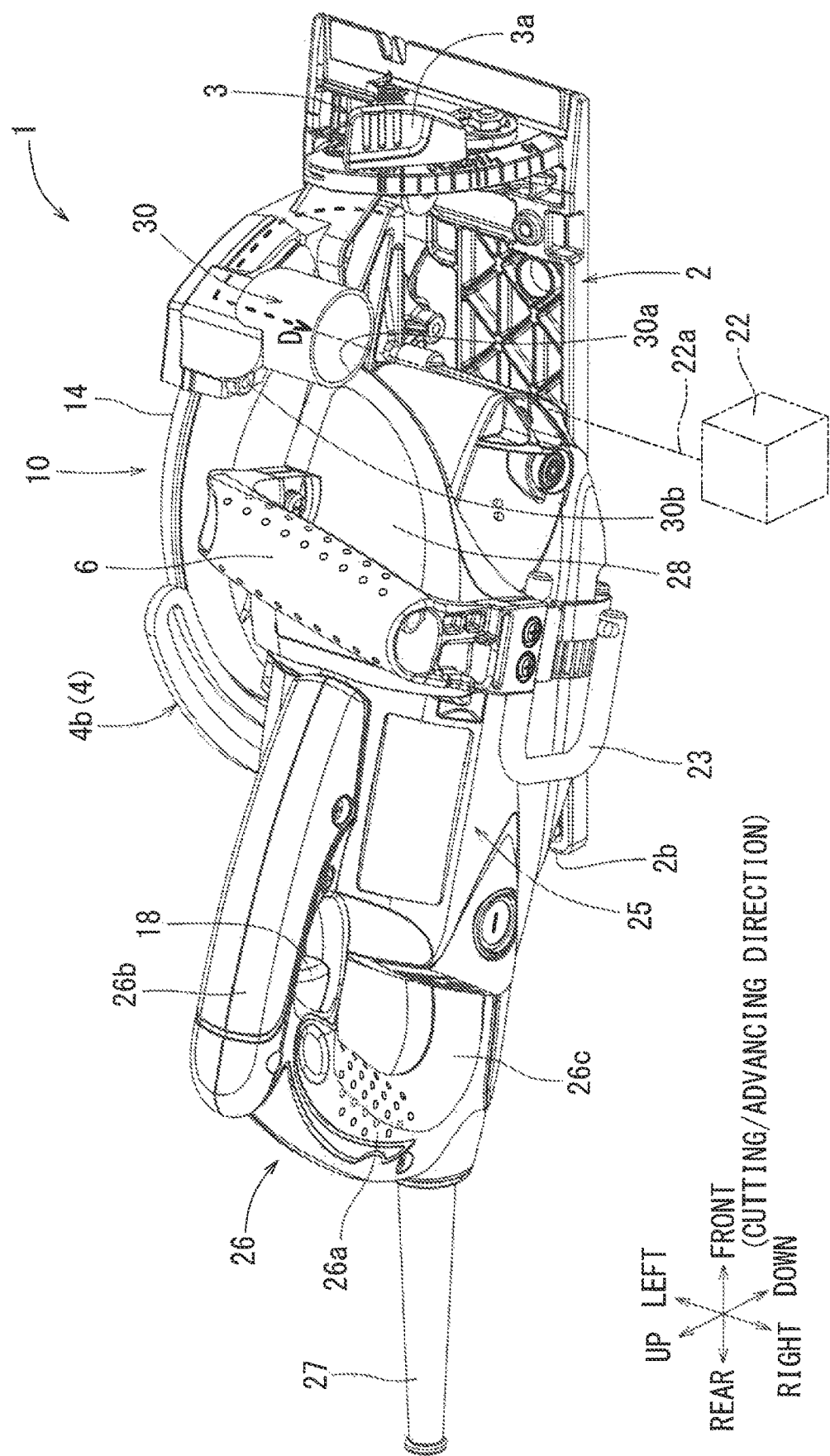
FIG. 9 is an overall perspective view of the cutting device according to another exemplary embodiment (third embodiment).
Figure 10:
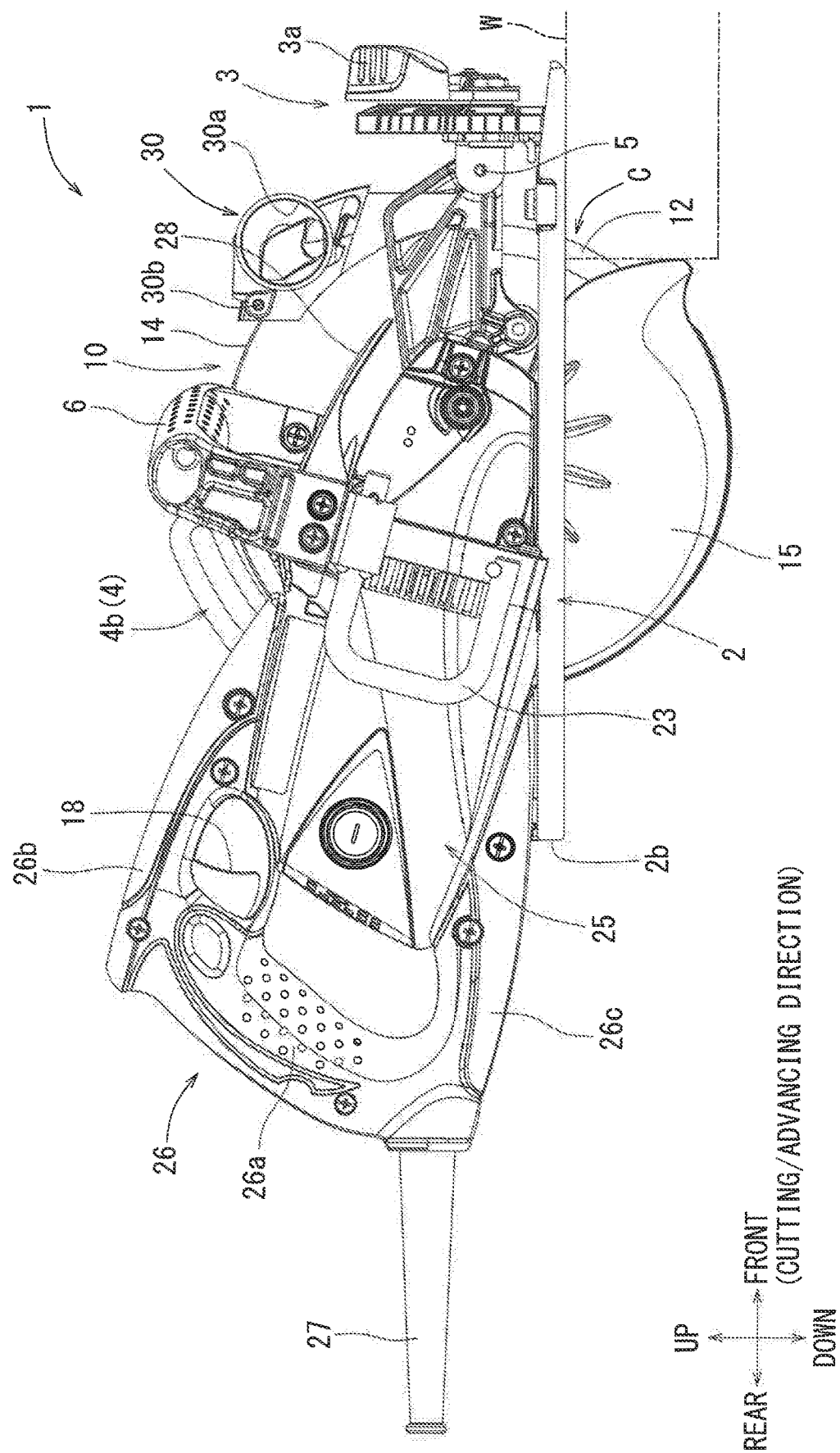
FIG. 10 is a side view of the cutting device according to the third embodiment.
Figure 11:
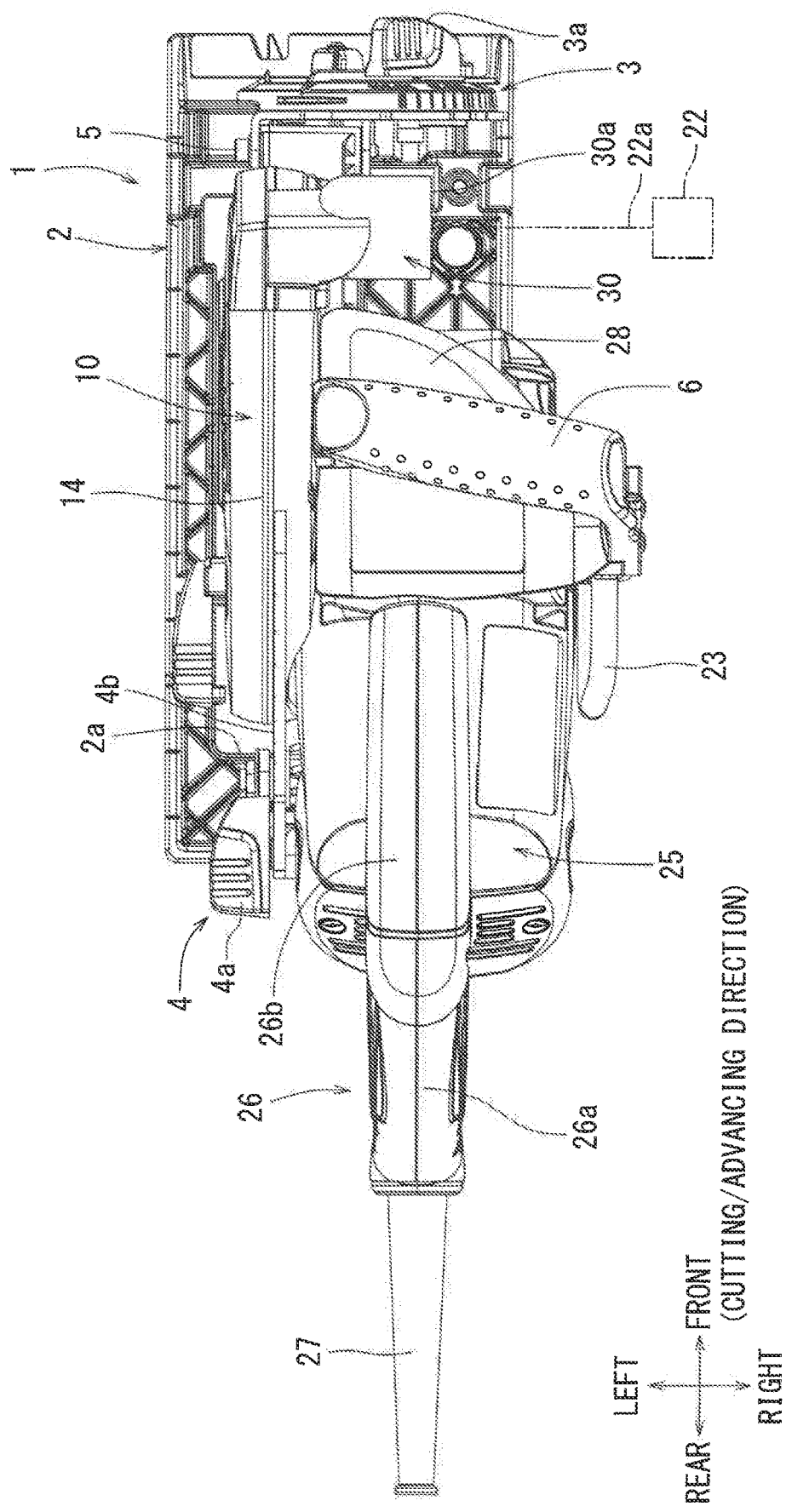
FIG. 11 is a plan view of the cutting device according to the third embodiment.
Figure 12:
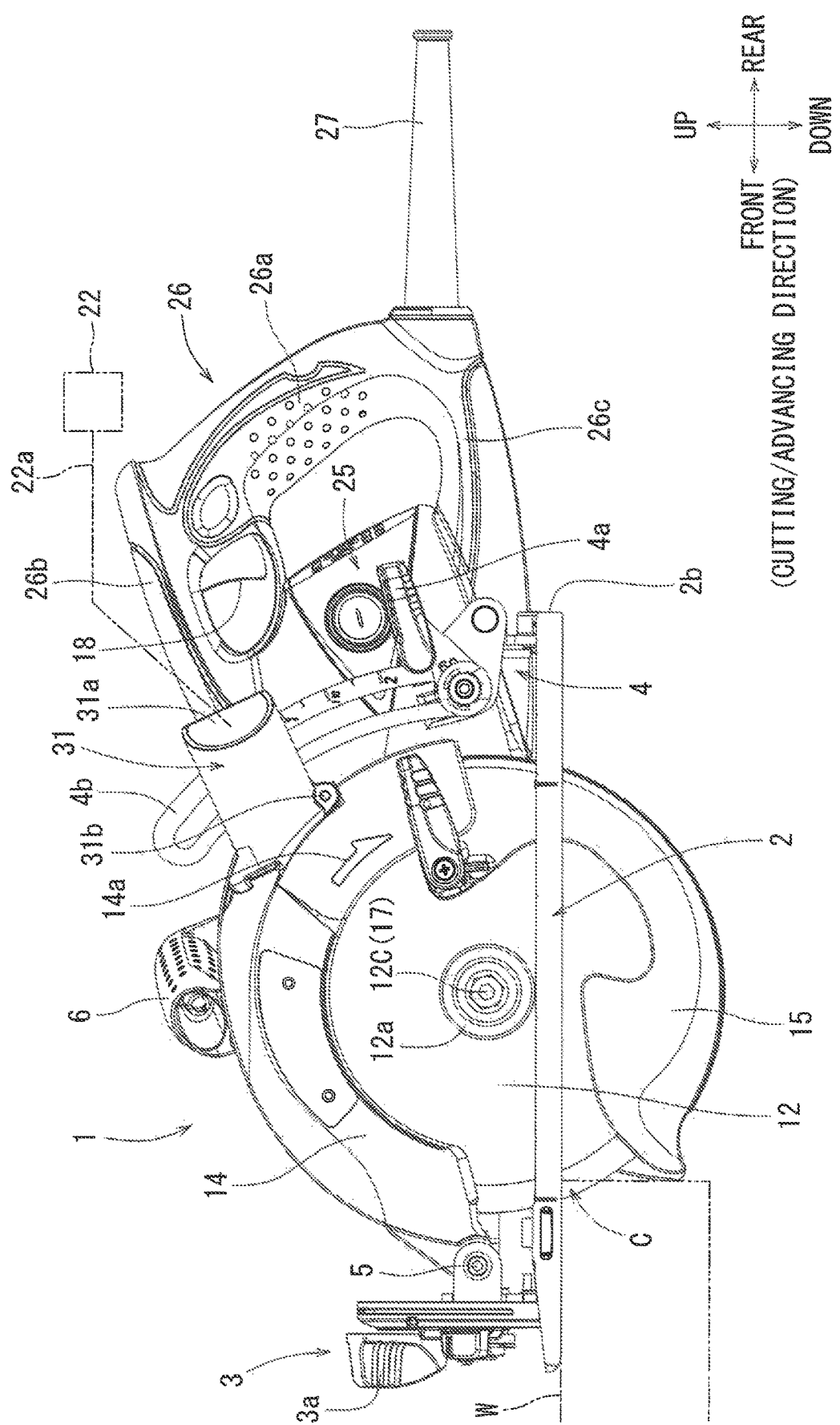
FIG. 12 is a side view of the cutting device according to another exemplary embodiment (fourth embodiment), viewed from an opposite side of the electric motor.
Figure 13:
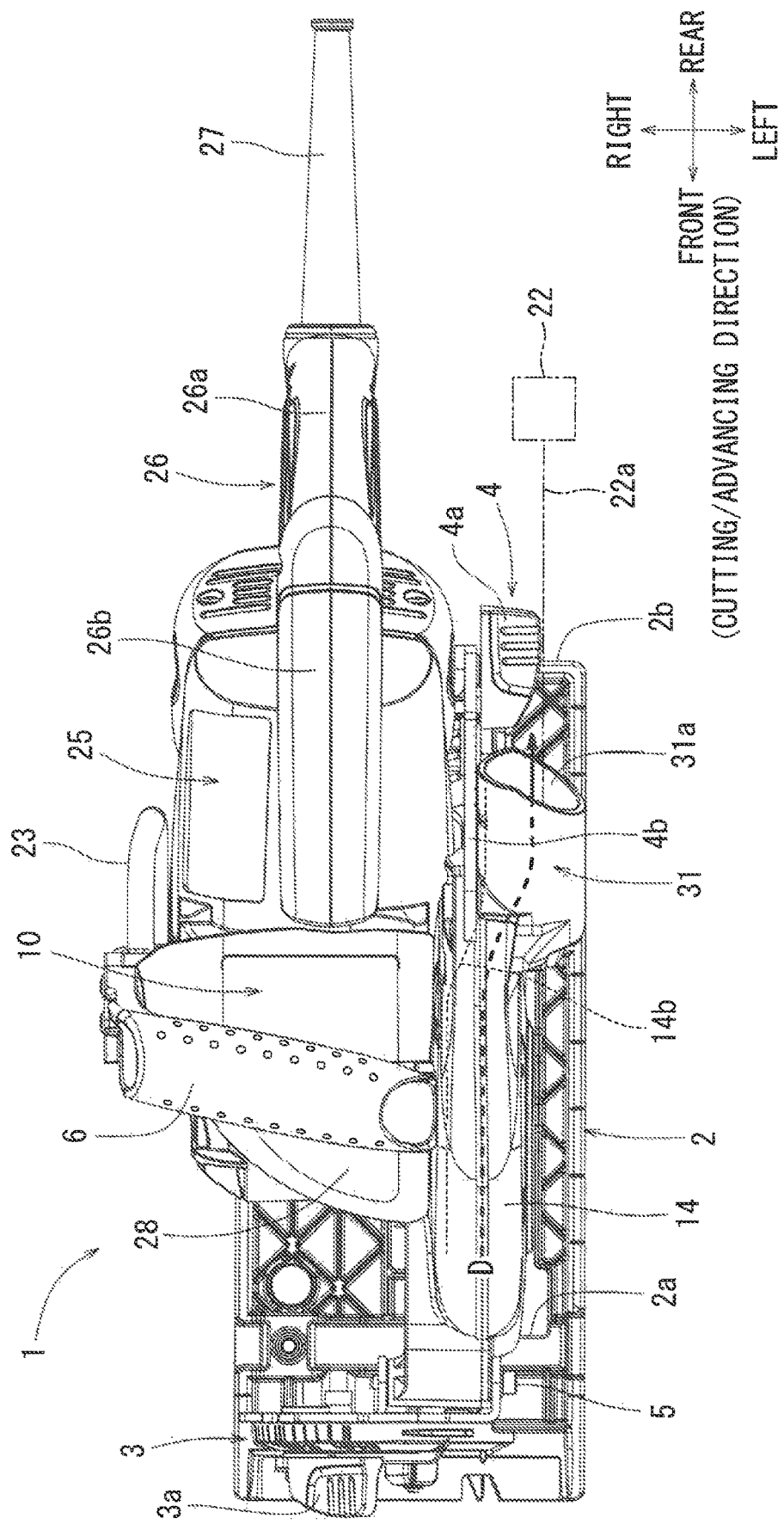
FIG. 13 is a plan view of the cutting device according to the fourth embodiment.
Figure 14:
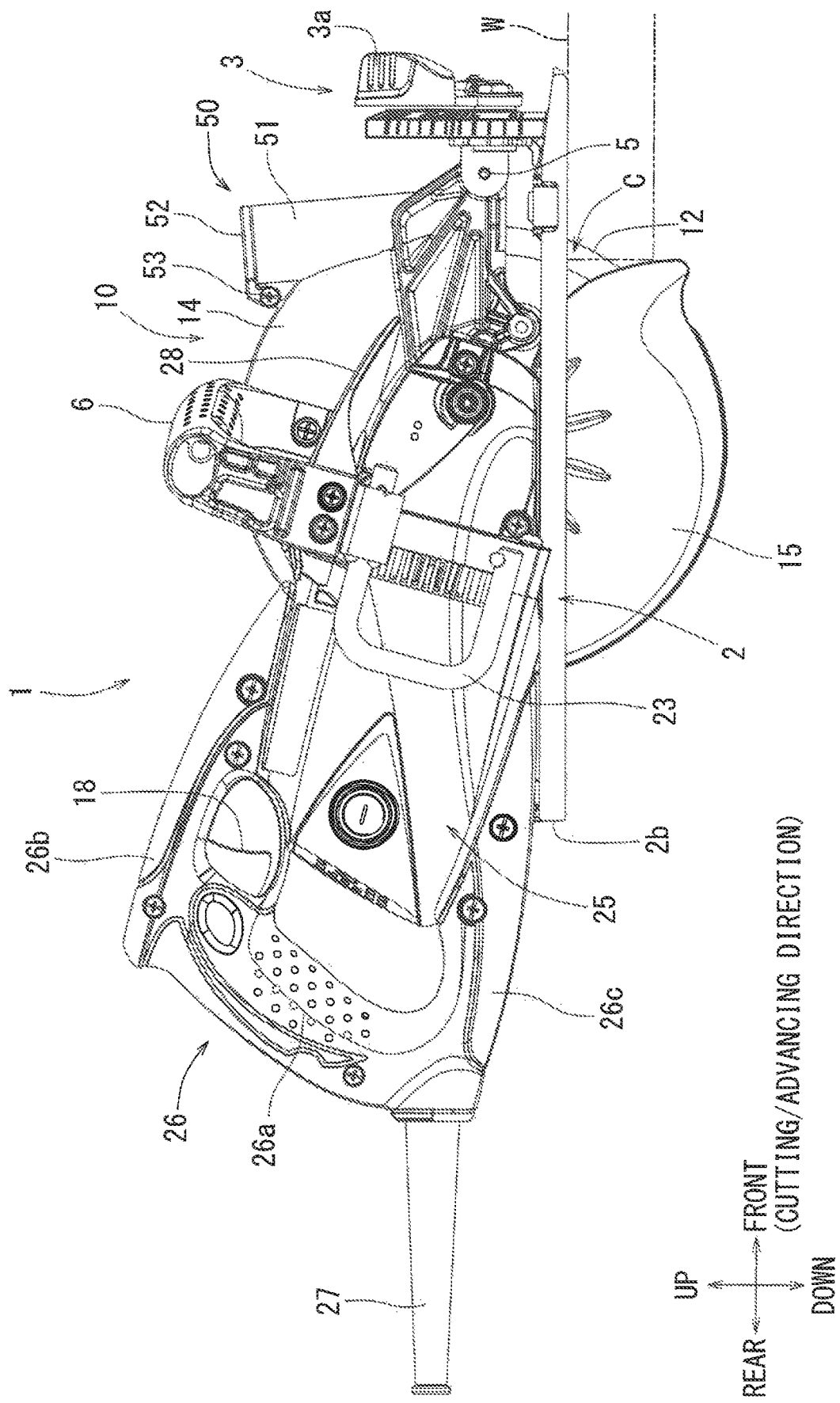
FIG. 14 is a right side view of the cutting device according to another exemplary embodiment (fifth embodiment).

FIGS. 9 to 13 show further additional embodiments. FIGS. 9 to 11 show a third embodiment and FIGS. 12 to 14 show a fourth embodiment. Configurations of these embodiments are the same as the second embodiment aside from the placement of the dust collection nozzle. That is, the AC-driven cutting device 1 is shown in the third and fourth embodiments as well as in the second embodiment. In these embodiments, the electric motor 25 may be attached to the cutting device 1 such that the axis of the electric motor 25 extends along the surface of the rotary cutting blade 12. Descriptions of the members and configurations that do not need to be modified and are in common with the first and second embodiments are omitted by use of the same reference numerals.

As shown in FIGS. 9 to 11, in the third embodiment, the dust collection nozzle 30 may be screw-fixed to an upper front side of the fixing cover 14 at a screw fastening portion 30b. As described above, members and configurations are the same as those in the second embodiment. Thus, the motor with brush may be used as the electric motor 25. A connection port 30a may be in fluid communication with an interior of the fixing cover 14. The dust collection device 22 such as a dust collector etc. may be connected to the dust collection port 30a via the connection hose 22a. Cutting dust and/or cutting powder blown out from the cutting position C in the upward direction by the rotation of the rotary cutting device 12 may flow through the dust collection nozzle 30 and be collected by the dust collection device 22. Thus, a safer working environment can be established. FIG. 9, which shows the third embodiment, shows a thick broken line with an arrow D depicting the flow path of cutting dust that flows from the cutting position C to the connection port 30a of the dust collection nozzle 30.

As shown in FIGS. 12 to 13, in the fourth embodiment, the dust collection nozzle 31 may be screw-fixed to a rear upper side of the fixing cover 14 at a screw fastening portion 31b. Members and configurations are the same as those in the second and third embodiments. Thus, a brush motor may be used as the electric motor 25. The dust collection nozzle 31 may be in fluid communication with the interior of the fixing cover 14 via an exhaustion hole provided on the left wall side of the fixing cover 14. The dust collection device 22 such as the dust collector etc. may be connected to the connection port 31a of the dust collection nozzle 31 via the connection hose 22a. The dust collection nozzle 31 (the connection port 31a) may be arranged in a direction parallel to the rotary cutting blade 12 at a position offset rearward and upward to the left side of the fixing cover 14 so as not to interfere with members comprising the rear support 4 etc. such as the depth guide 4b. As shown by a void arrow 14a of FIG. 12, the rotary cutting blade 12 may rotate in a clockwise direction. Cutting dust generated at the cutting position C may be blown out in the upward direction by rotation of the rotary cutting blade 12, and eventually through the dust collection nozzle 31.

In particular, cutting dust blown out in the upward direction may flow along the interior of the fixing cover 14 in the rearward direction. Cutting dust flowing in the rearward direction may be directed along an arc surface 14b of the right inner wall of the fixing cover 14 where the flow-path of cutting dust may gradually shift from right to left, as shown by the broken line of FIG. 13. Subsequently, cutting dust may enter into the exhaustion hole upwards in a diagonally rear left direction, where said exhaustion hole is provided on the left wall side of the fixing cover 14 (in an angled upper-rear direction relative to the upper-rear surface of the rotary cutting blade 12). Cutting dust may flow into the dust collection nozzle 31 thereafter via the exhaustion hole. Cutting dust flowing into the dust collection nozzle 31 may flow along the boundary of the left inner circumference surface of the connection port 31a. In other words, cutting dust flowing in the diagonally rear left direction (in the direction angled relative to the surface of the rotary cutting blade 12) may be forced to flow in a direction parallel to the surface of the rotary cutting blade 12. FIG. 13 shows a thick broken line with an arrow D depicting the flow path of cutting dust that flows from within the fixing cover 14 to the connection port 31a of the dust collection nozzle 31. Cutting dust may subsequently be collected by the dust collection device 22 through the connection hose 22a after flowing out through the dust collection nozzle 31 parallel to the rotary cutting blade 12. In this way, cutting dust generated by the cutting task may be collected by the dust collection device 22 and any scattering around of cutting dust can be prevented or restricted. Thus, a safer working environment can be established.

In the above-described embodiments, the dust collection nozzles 20, 30 and 31 are configured to be screw-fixed to the fixing cover 14. However, the dust collection nozzles 20, 30 and 31 may be attached by other connection means such as an engagement means or an adhesion means etc. As a further alternative, the dust collection nozzle may be configured to be integrally formed with the fixing cover.

FIGS. 14 to 19 show a dust collection nozzle 50 of a further another embodiment (fifth embodiment). In the cutting device 1 according to the fifth embodiment, the electric motor 25 may be attached to the cutting device 1 such that the motor axis extends along the surface of the rotary cutting blade 12 (in the longitudinal direction of the cutting device 1) similar to the second to fourth embodiments. The electric motor 25 may also be a brush motor, and the cutting device 1 of the fifth embodiment may be operated by AC power as well as in the second to fourth embodiments. The power cord 27 for supplying AC power to the cutting device 1 may be pulled out from the rear of the handle 26.

In the fifth embodiment, however, the dust collection nozzle 50 of the fifth embodiment may be provided at the front of the fixing cover 14. The dust collection nozzle 50 of the fifth embodiment may be provided with a nozzle main body 51 and a cap 52. The nozzle main body 51 may have a cylindrical tubular shape and may be integrally formed with the front of the fixing cover 14. The interior of the nozzle main body 51 may be open to and in fluid communication with the interior of the fixing cover 14. As shown in the figures, the nozzle main body 51 may be provided in an erected state to stand in a vertically upward direction when the protruding length of the rotary cutting blade 12 protruding below the lower surface of the base 2 is set to its maximum. Furthermore, the nozzle main body 51 may be provided at the front of the fixing cover 14. With regard to the height direction, the nozzle main body 51 may extend in the upward direction in an area relatively close to the base 2, near the terminal front end of fixed cover 14.

Figure 15:
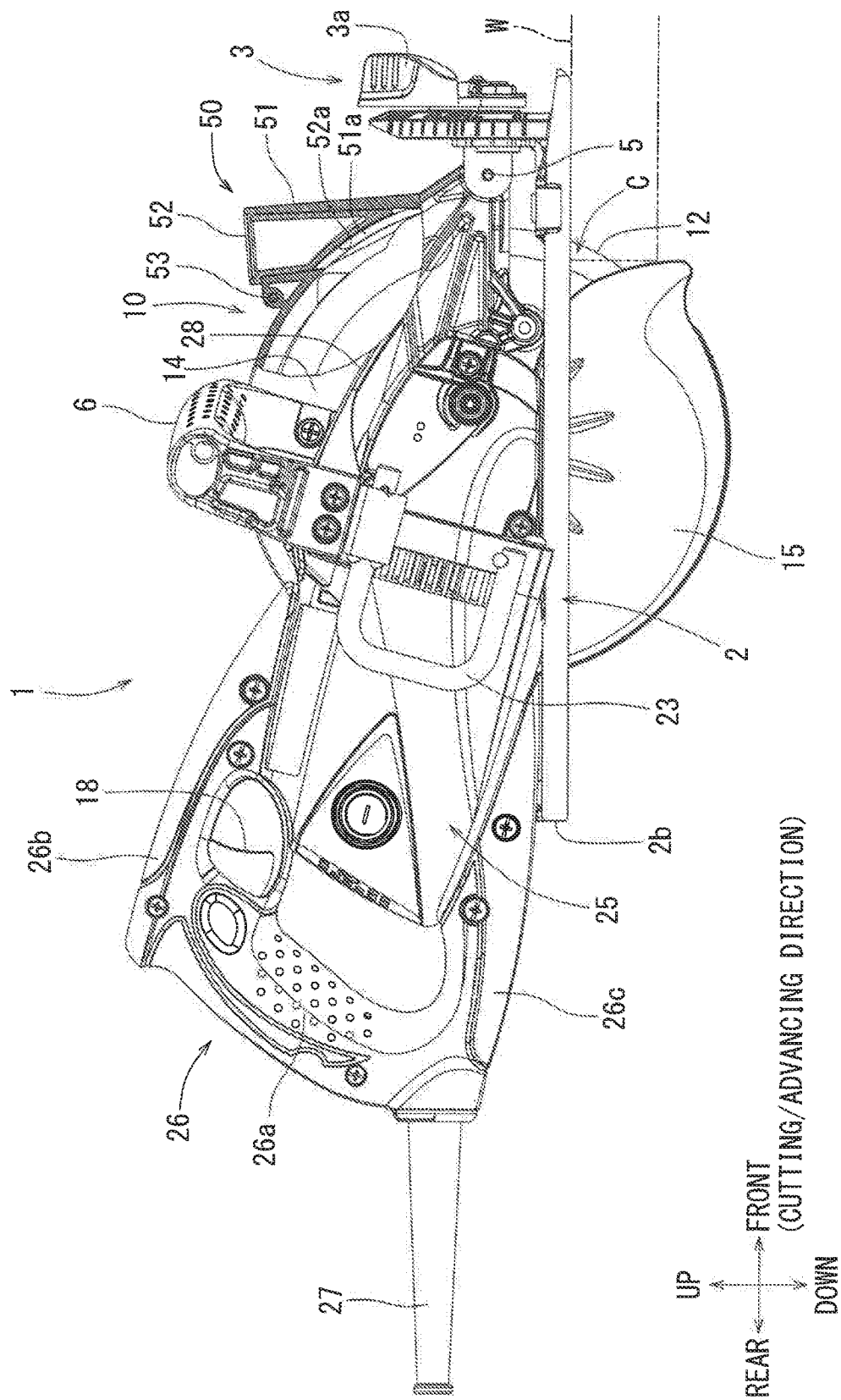
FIG. 15 is a right side view of the cutting device according to the fifth embodiment, showing a longitudinal cross section around a dust collection adapter.
Figure 16:
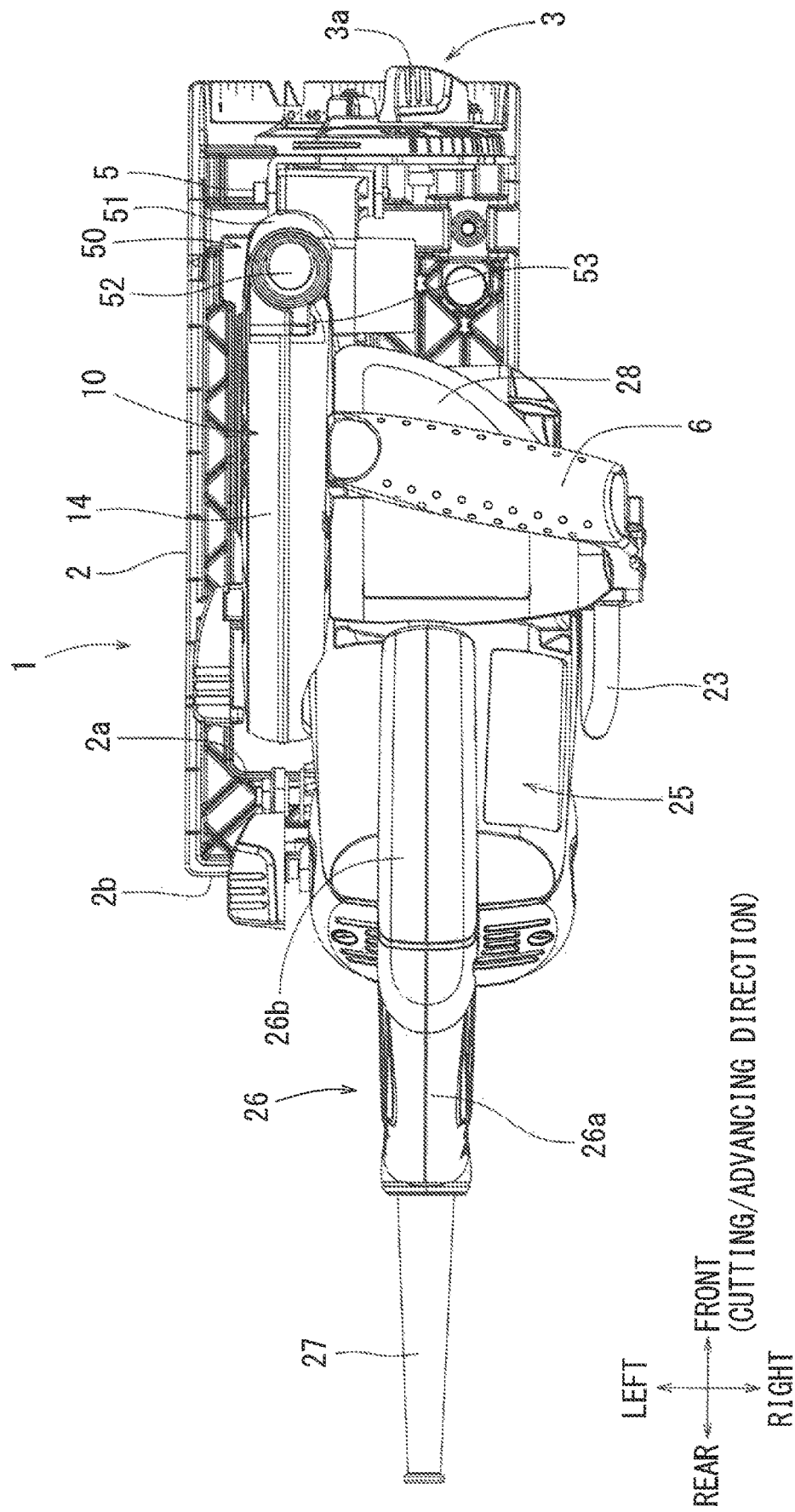
FIG. 16 is a plan view of the cutting device according to the fifth embodiment.
Figure 17:
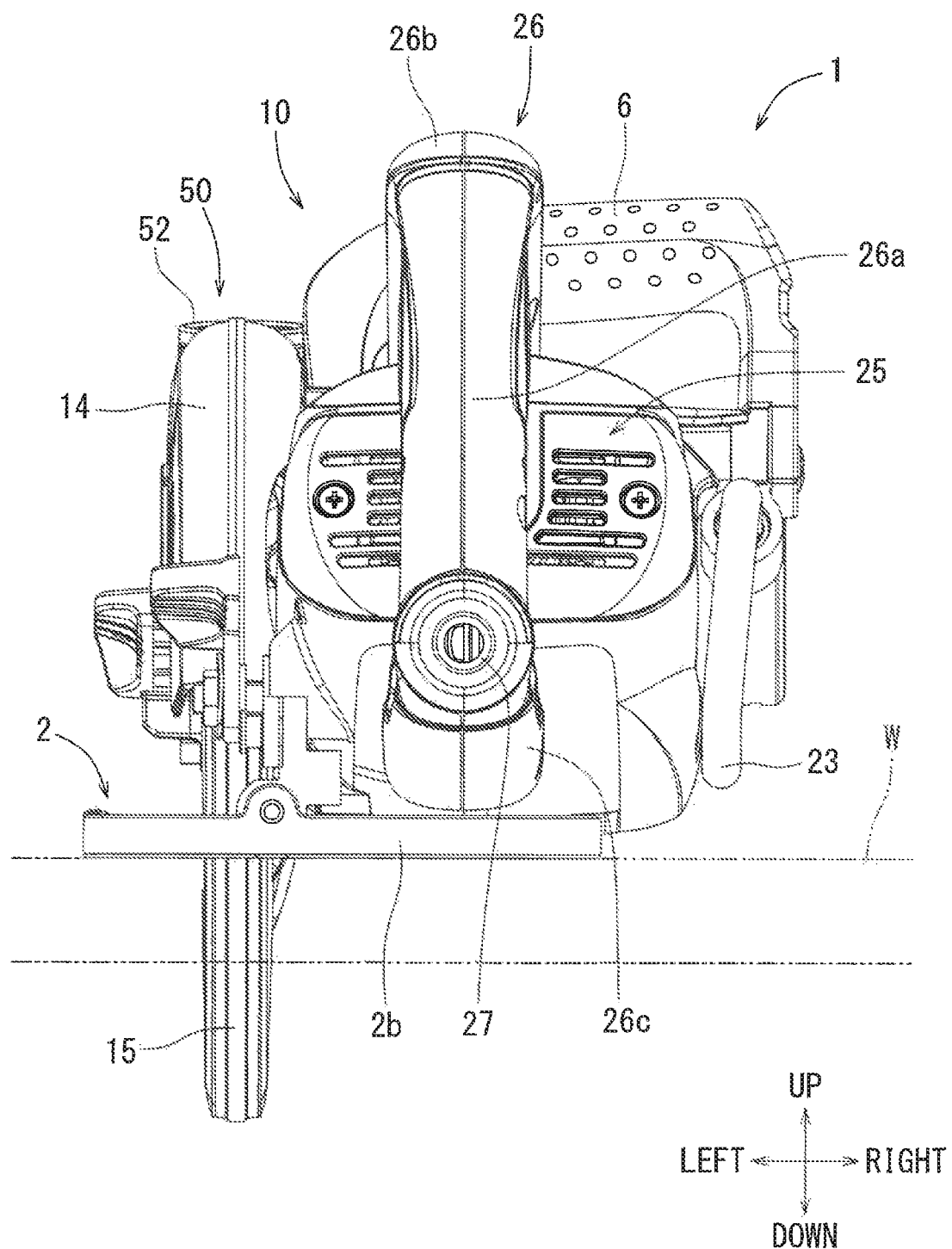
FIG. 17 is a back view of the cutting device according to the fifth embodiment.

When the dust collection device 22 such as the dust collector etc. is not connected to the nozzle main body 51, an upper opening of the nozzle main body 51 can be closed by the cap 52. As shown in FIG. 15, the cap 52 may also have an approximately tubular shape.

Furthermore, the cap 52 may have a curved edge at its base bottom 52a. With the curvature-shaped bottom 52a, approximately all of the inner portion of the nozzle main body 51 may be covered and/or closed with respect to the interior of the fixing cover 14 because of the complementary fitting nature of the bottom 52a with the front end of the fixed cover 14. Furthermore, with the curvature-shaped bottom 52a, a large vertical step is prevented on the inner circumference surface of the fixing cover 14. Thus, the inner circumference surface of the fixing cover 14 may be in a manner flush to the dust collection nozzle 50 and cutting dust accumulation can be reduced. The cap 52 may be screw-fixed to the nozzle main body 51 by the fixing screw 53.

Figure 18:
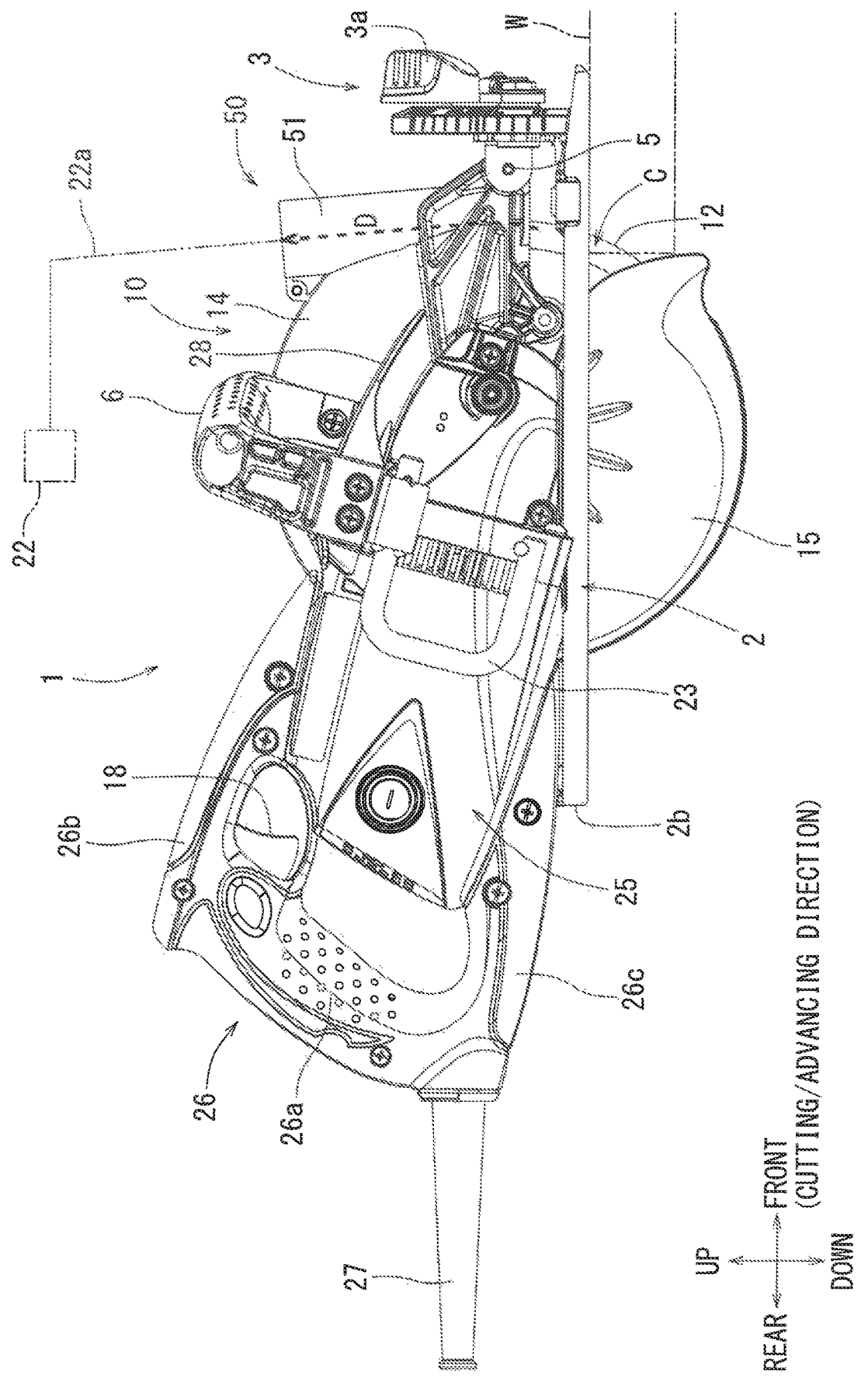
FIG. 18 is a right side view of the cutting device according to the fifth embodiment, showing a state where a cap of the dust collection adapter is removed.
Figure 19:
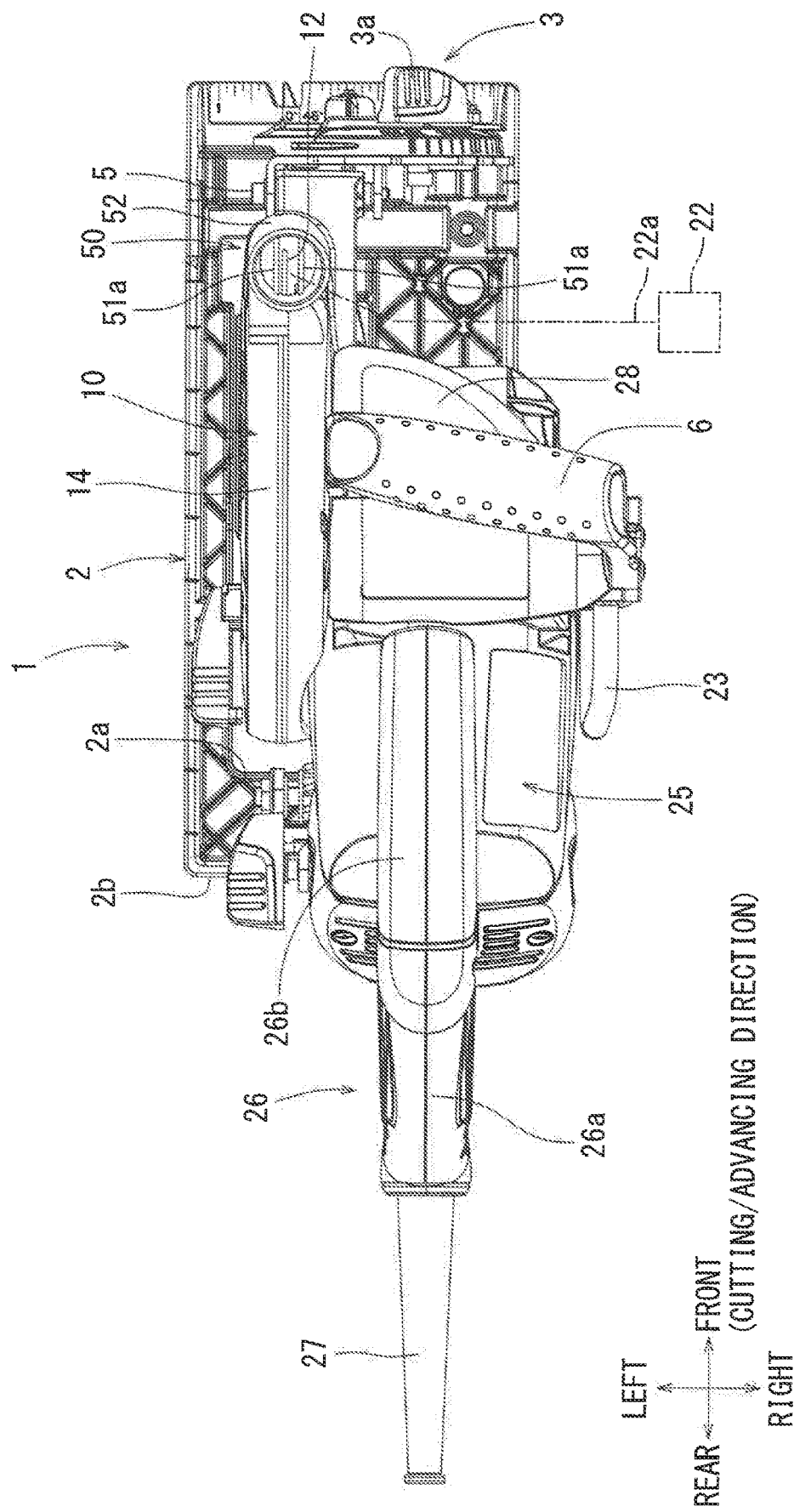
FIG. 19 is a plan view of the cutting device according to the fifth embodiment, showing a state where a cap of the dust collection adapter is removed.
Figure 20:
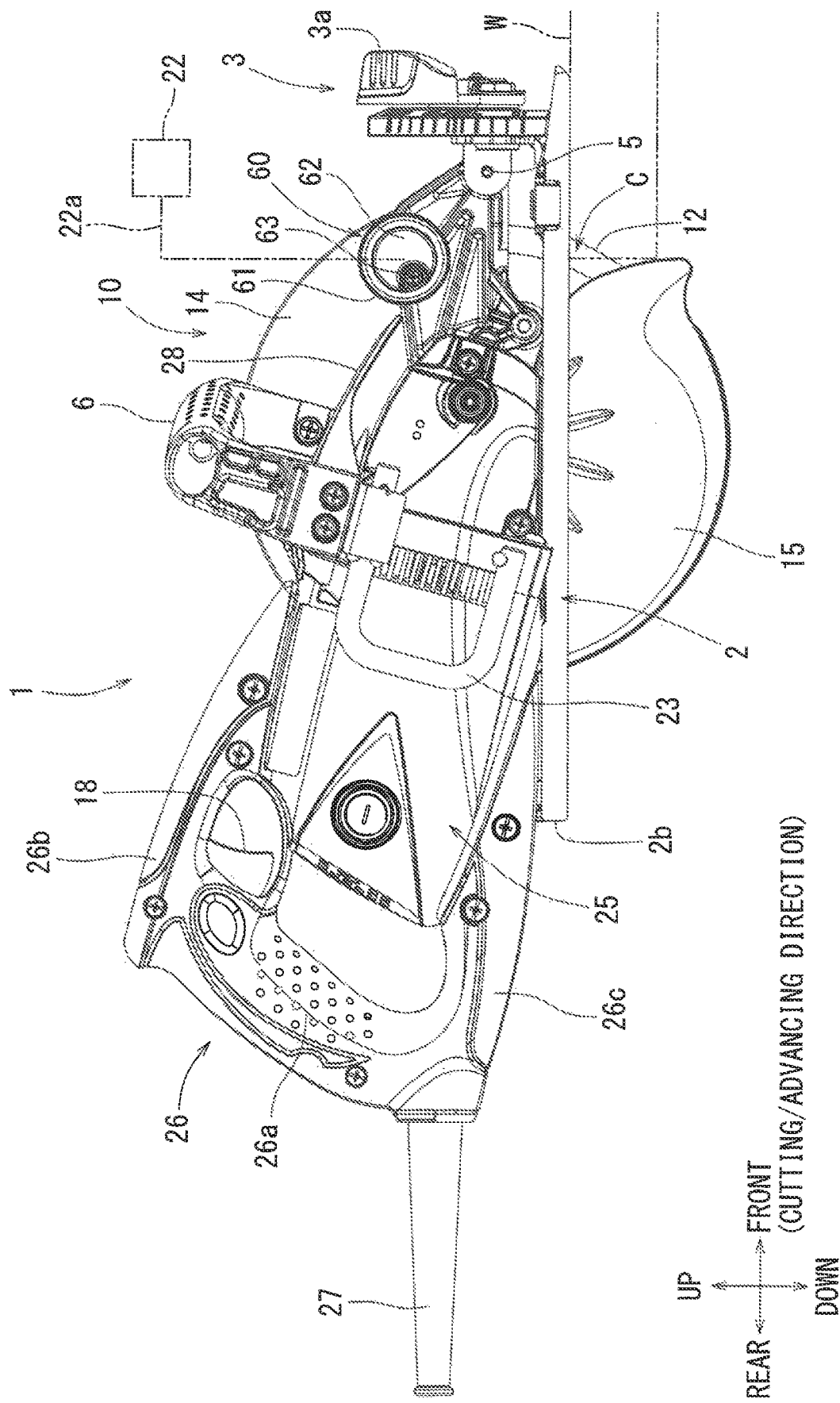
FIG. 20 is a right side view of the cutting device according to another exemplary embodiment (sixth embodiment).
Figure 21:
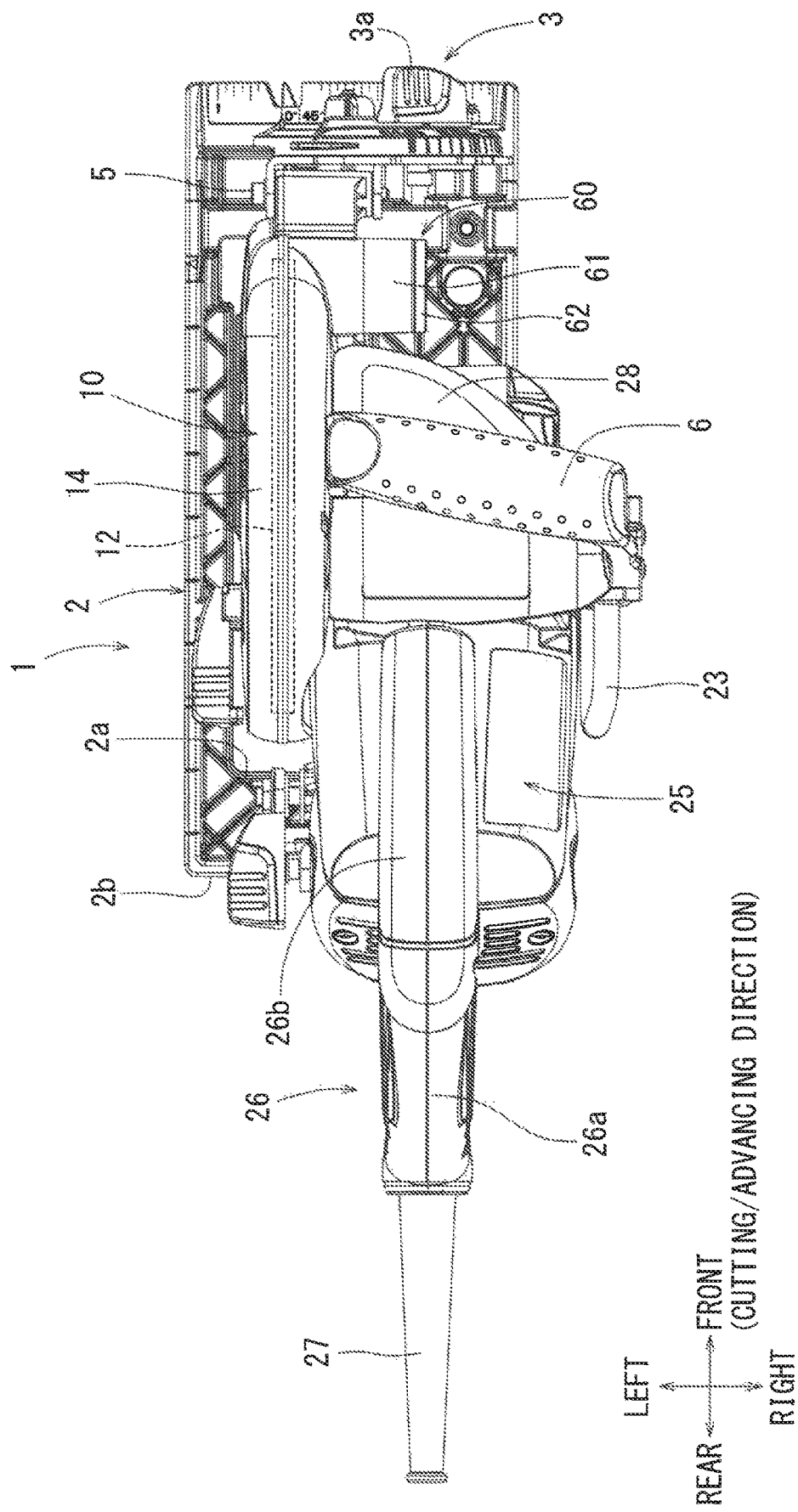
FIG. 21 is a plan view of the cutting device according to the sixth embodiment.

The cap 52 may be removed from the nozzle main body 51 by loosening the fixing screw 53. FIGS. 18 and 19 show a state where the cap 52 is removed from the nozzle main body 51. In this removed state, the dust collection device 22 can be connected to the nozzle main body 51 via a connection hose 22a. As the dust collection device 22, the dust collection bag or the dust collection box can be connected to the nozzle main body 51 as along with the dust collector. Cutting dust blown out from the cutting position C can be effectively collected by the dust collection device 22 through the nozzle main body 51 near the front of the base 2 that is disposed approximately above the cutting position C.

As shown in FIGS. 15 and 19, two rear-to-front ribs 51a may be provided on the left and right sides of the fixing cover 14 at an opening of the nozzle main body 51. The number of the ribs 51a may be changed as needed. The two ribs 51a may extend in the front-to-rear direction (along the surface of the rotary cutting blade 12) parallel to each other. An airflow (cutting airflow) generated by rotation of the rotary cutting blade 12 may be blown to the two ribs 51a, which in turn aid in smoothly directing the air into the nozzle main body 51. Because of this smoothly directed airflow configuration, cutting dust blown out from the cutting position C can be more effectively directed toward into the nozzle main body 51, which can in turn increase dust collection efficiency of the connected dust collection device 22. FIG. 18, which shows the fifth embodiment, shows a thick broken line with an arrow D showing a flow of cutting dust that flows from the cutting position C to the dust collection nozzle 51.

According to the dust collection nozzle 50 of the fifth embodiment as discussed above, the handle 26 of the cutting device 1 may project largely in the rearward direction and the holding portion 26a of the handle 26 may be disposed at its furthest behind the rear end 2b of the base 2 when the cutting depth is adjusted to its maximum. Because of this configuration, the user can easily and advantageously operate the cutting device 1 while standing, and at the same time, dust collection efficiency of the dust collection device 22 can be improved.

Furthermore, in the fifth embodiment, the nozzle main body 51 may be provided at the front of the fixing cover 14 extending in the upward direction approximately above the cutting position C. Because of this configuration, cutting dust can be immediately collected right after being blown out in the upward direction from the cutting position C. In this respect, dust collection efficiency of the dust collection device 22 can be improved.

Furthermore, according to the dust collection nozzle 50 of the fifth embodiment, the nozzle main body 51 can be closed by the cap 52. Thus, when the dust collection device 22 is not connected to the nozzle main body 51, said cap may prevent foreign substances from entering into the fixing cover 14 through the nozzle main body 51.

FIGS. 20 to 23 shows a dust collection nozzle 60 of further another embodiment (sixth embodiment). The dust collection nozzle 60 of the sixth embodiment may protrude from the front of the fixing cover 14 in the rightward direction. The dust collection nozzle 60 of the sixth embodiment may be disposed below an upper end of the electric motor 25 and relatively close to the base 2, extending rightward from the front of the fixing cover 14 parallel to the base 2. The electric motor 25 may a brush motor. Furthermore, the dust collection nozzle 60 of the sixth embodiment may extend in a direction perpendicular to the rotary cutting blade 12. The dust collection nozzle 60 of the sixth embodiment may be provided with a nozzle main body 61 and a cap 62. An opening of the nozzle main body 61 may be covered and/or closed by the cap 62.

The nozzle main body 61 may have a cylindrical tubular shape such that the connection hose 22a of the dust collection device 22 can be connected thereto, and the nozzle main body 61 may be integrally formed with the front of the fixing cover 14. The interior of the nozzle main body 61 may be opened to the interior region of the fixing cover 14 approximately above the cutting position C. The cap 62 can be screw-fixed to the nozzle main body 61 by the fixing screw 63. The cap 62 can be removed from the nozzle main body 61 by loosening the fixing screw 63. By removing the cap 62, the dust collection device 22 can be connected to the nozzle main body 61 by connecting the connection hose 22a with nozzle main body 61. The dust collection bag or the dust collection box may be attached to the nozzle main body 61 as the dust collection device 22 as described above.

Figure 24:
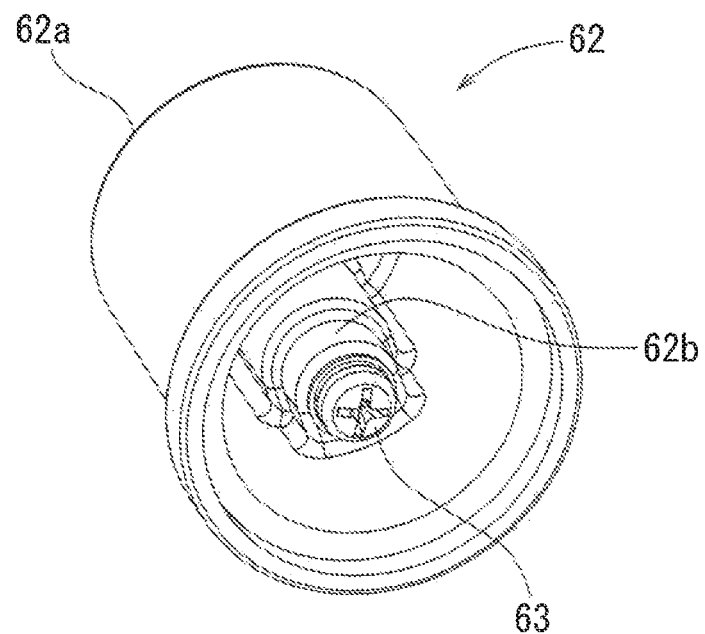
FIG. 24 is a perspective view of a cap, viewed from an opening thereof.
Figure 25:
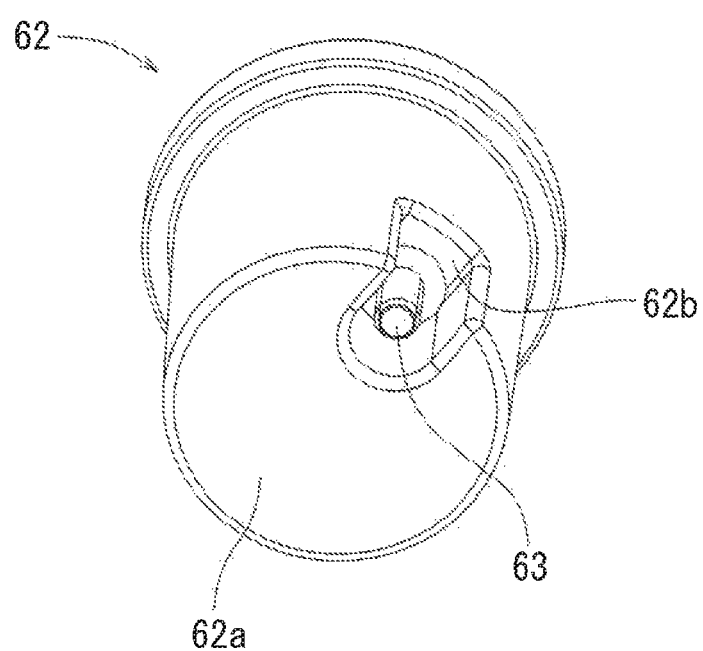
FIG. 25 is a perspective view of the cap, viewed from a bottom thereof.

FIGS. 24 and 25 show the cap 62 as one unit, which is removed from the nozzle main body 61. The cap 62 may have a two-stage cylindrical tubular shape with a concentrically smaller and larger radius so as to be inserted in a complementary fitting manner into the inner circumference of the nozzle main body 61 almost without a gap. Furthermore, the tubular cap 62 may have a sufficient length to cover almost the entirety of the inner of the nozzle main body 61 and eventually the opening of the fixing cover 14. A bottom 62a of the cap 62 attached to the nozzle main body 61 may completely cover the opening of the fixing cover 14.

Figure 26:
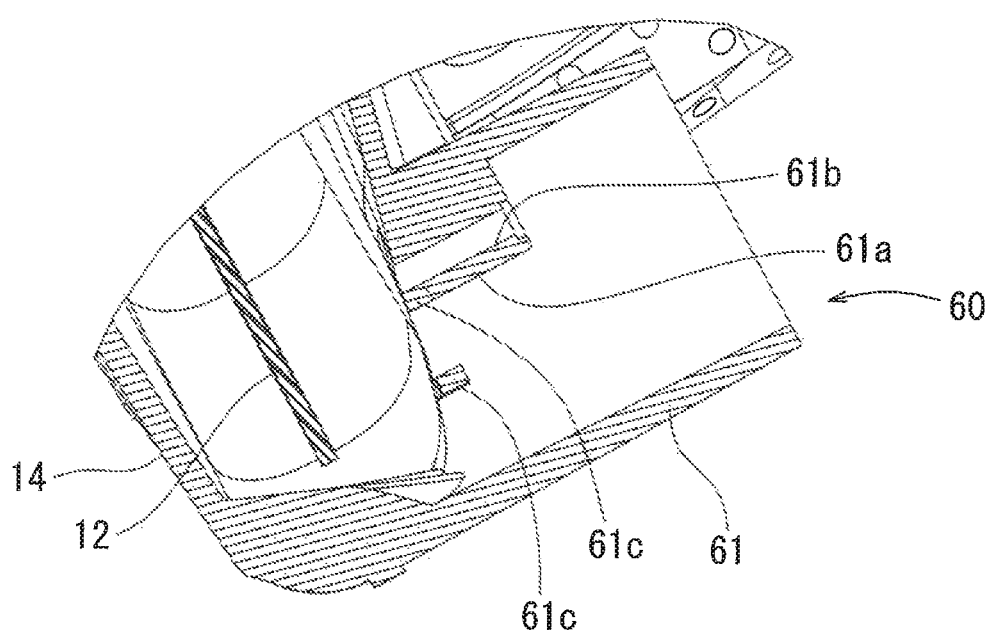
FIG. 26 is a cross-sectional view taken along line (XXVI)-(XXVI) of FIG. 22, showing a cross-sectional view of a nozzle main body and its surroundings.

A step portion 62b for screw fastening may be provided on the inner circumference of the cap 62. The fixing screw 63 may be inserted to the step 62b. Corresponding to the step portion 62b, a step receiving portion 61a may be provided inside the nozzle main body 61 as shown in FIG. 26. A screw hole 61b into which the fixing screw 63 is fastened may be provided in the step receiving portion 61a. When the cap 62 is inserted and attached to the inner circumference of the nozzle main body 61, the step portion 62b may be brought into touching contact with the step receiving portion 61a. Because of this configuration, the step receiving portion 61a may work as a stopper that limits an insertion length of the cap 62 with respect to the nozzle main body 61. The step portion 62b may be provided as part of either one of the cap 62 and the nozzle main body 61, with the step receiving portion 61a being provided as part of the other of the two.

Figure 22:
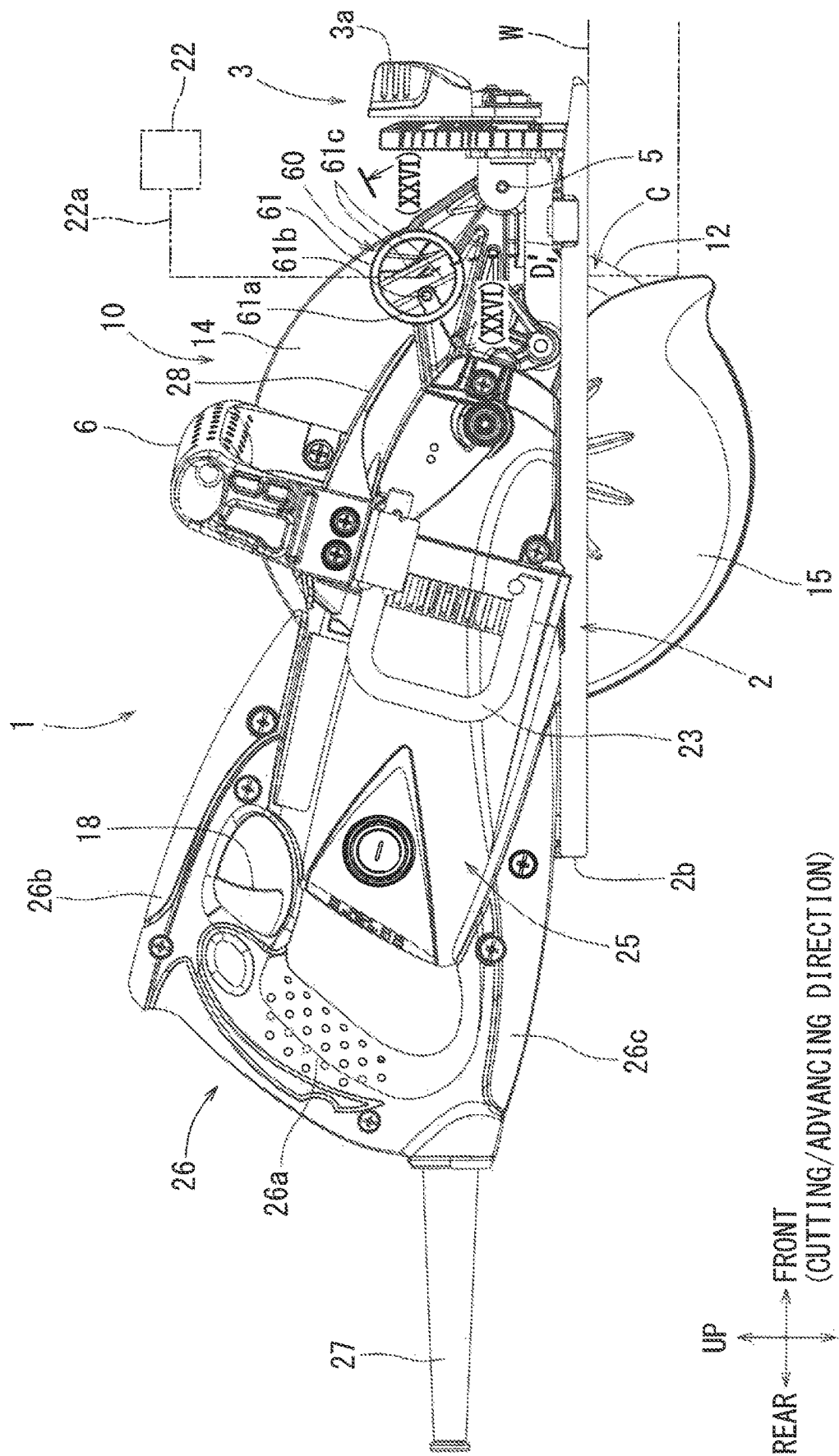
FIG. 22 is a right side view of the cutting device according to the sixth embodiment, showing a state where a cap of the dust collection adapter is removed.
Figure 23:
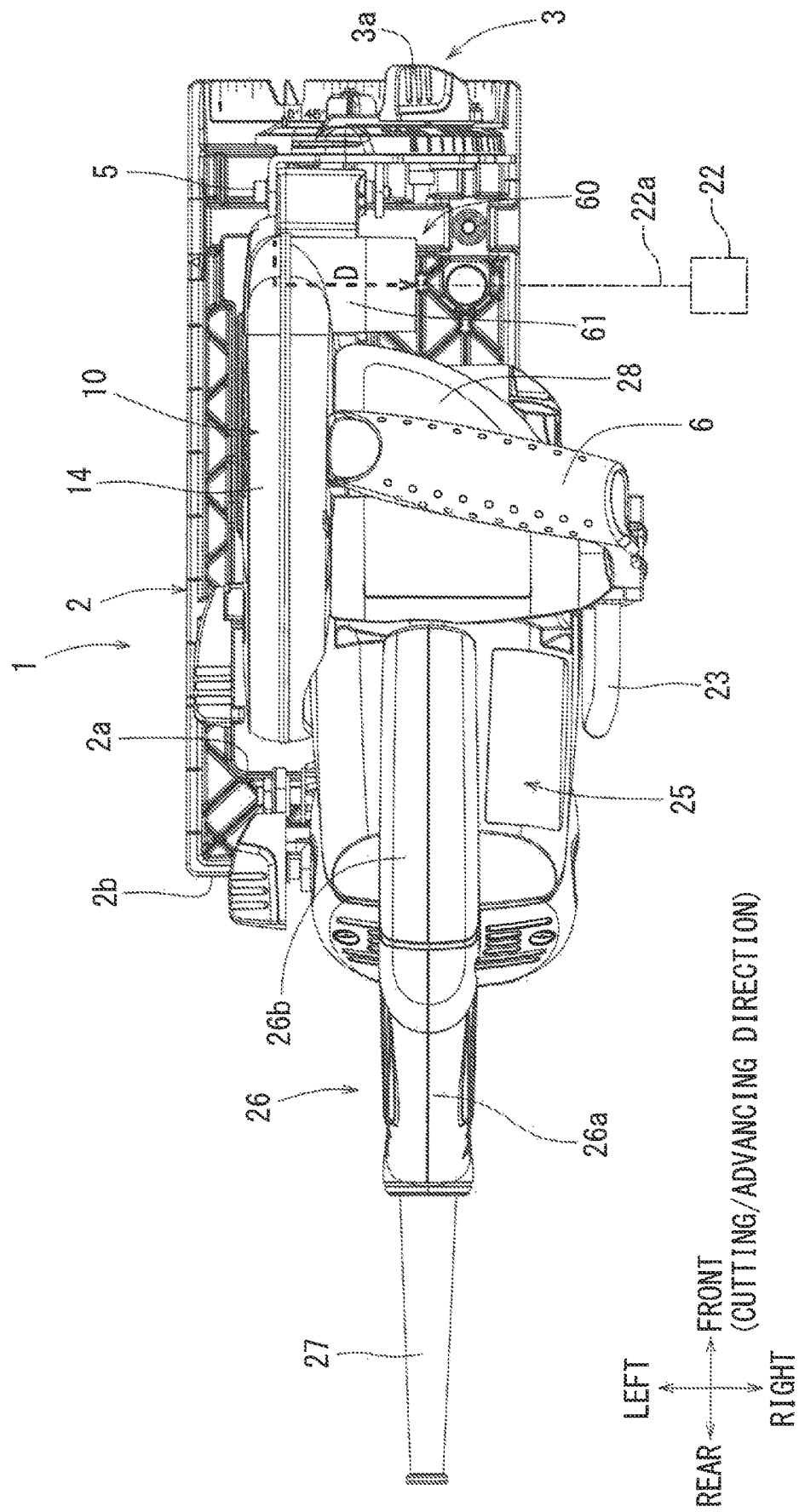
FIG. 23 is a plan view of the cutting device according to the sixth embodiment, showing a state where a cap of the dust collection adapter is removed.

As shown in FIGS. 22 and 26, two ribs 61c for directing the flow path of cutting dust may be provided on the inner circumference of the nozzle main body 61. The number of ribs 61c may be changed as needed. The two ribs 61c may extend in parallel with each other along an airflow generated by rotation of the rotary cutting blade 12 in a counterclockwise direction in FIG. 22. The airflow of cutting dust blown out from the cutting position C may be blown toward the two ribs 61c and directed toward the inner circumference of the nozzle main body 61. Because of this configuration, dust collection efficiency of the dust collection device 22 that is connected to the cutting device 1 can be improved. FIGS. 22 and 23, which show the sixth embodiment, show a thick broken line with an arrow D showing a flow of cutting dust flowing from the cutting position C to the nozzle main body 61 of the dust collection nozzle 60.

According to the dust collection nozzle 60 of the sixth embodiment as discussed above, the handle 26 of the cutting device 1 may project at its furthest in the rearward direction and the holding portion 26a of the handle 26 may be disposed furthest behind the rear end 2b of the base 2 when the cutting depth is adjusted to the maximum. Because of this configuration, the user can easily and advantageously operate the cutting device 1 while standing, and at the same time, dust collection efficiency of the dust collection device 22 can be improved. By improving dust collection efficiency of this type of cutting device 1, a safer working environment can be established.

Furthermore, according to the dust collection nozzle 60 of the sixth embodiment, the dust collection nozzle 60 may be disposed below the upper end of the electric motor 25 and relatively close to the cutting position C. Because of this configuration, relatively heavy and large cutting dust can be immediately collected just after generation due to the cutting. Furthermore, the dust collection nozzle 60 may extend parallel to the base 2, and thus due to the rightward extension of dust collection nozzle 60, cutting dust that has been once collected may not drop and return to the cutting position C. In this respect, dust collection efficiency is enhanced.

Furthermore, according to the dust collection nozzle 60 of the sixth embodiment, the nozzle main body 61 may extend in a direction perpendicular to the surface of the rotary cutting device 12. Thus, the connection hose 22a of the dust collection device 22 can be pulled out in the direction perpendicular to the rotary cutting blade 12. Because of this configuration, the connection hose 22a can be easily arranged so as not to interfere with an operation of the portable cutting device.

Furthermore, according to the dust collection nozzle 60 of the sixth embodiment, two ribs 61c provided in the opening of the nozzle main body 61 on the side of the fixing cover 14 can smoothly direct the airflow of cutting dust toward into the nozzle main body 61. In this respect, dust collection efficiency of the dust collection nozzle 60 can be improved.

The dust collection nozzles 20, 30, 31, 50 and 60 of the above-discussed embodiments may be configured to combine as needed.

What is claimed is:

1. A portable cutting device comprising:
a base with which a material to be cut is brought into contact; and
a cutting device main body that is supported on an upper surface side of the base;
the cutting device main body comprising:
an electric motor;
a rotary cutting blade that is driven by the electric motor;
a fixing cover that covers the rotary cutting blade above the upper surface side of the base;
a handle that a user holds; and
a dust collection nozzle that (1) extends from the fixing cover, (2) is located above the base and on a same side of the cutting device main body as the electric motor, the same side being an opposite side from the fixing cover, (3) has a longitudinal axis that extends only in a direction perpendicular to side surfaces of the rotary cutting blade, and (4) includes an internal rib that extends parallel to the longitudinal axis, wherein:
the handle (1) includes a holding portion extending in an up-to-down direction and (2) is in a loop shape; and
when the cutting depth of the rotary cutting blade is set to a maximum, (1) the holding portion is configured to be positioned farthest behind a rear end of the base and (2) the internal rib is configured to be tilted upwards as the internal rib extends in a frontward-to-rearward direction when viewed in a direction transverse to the longitudinal axis.

2. The portable cutting device according to claim 1, wherein the dust collection nozzle is located below an upper end of the electric motor and extends parallel to the base.

3. A portable cutting device comprising:
a base with which a material to be cut is brought into contact; and
a cutting device main body that is supported on an upper surface side of the base;
the cutting device main body comprising:
an electric motor;
a rotary cutting blade that is driven by the electric motor;
a fixing cover that covers the rotary cutting blade above the upper surface side of the base;
a handle that a user holds; and
a dust collection nozzle that (1) includes a nozzle main body that extends from the fixing cover, on one end, and has a cap attachment at another end, (2) includes a cap detachably attached to the cap attachment, and (3) has a longitudinal axis that extends only in a direction perpendicular to side surfaces of the rotary cutting blade; wherein:
the handle (1) includes a holding portion extending in an up-to-down direction and (2) is in a loop shape; and
the holding portion is configured to be positioned farthest behind a rear end of the base when the cutting depth of the rotary cutting blade is set to a maximum.

4. The portable cutting device of claim 3, wherein the cap has a tubular shape with a bottom and an opening.

5. The portable cutting device of claim 3, wherein the cap is insertable into the nozzle main body in such a manner that a bottom of the cap fits in a complementary manner with the fixing cover and an opening of the cap extends in an outward direction relative to the fixing cover.

6. The portable cutting device of claim 3, the cap is detachably attached to the dust collection nozzle by use of a fixing member.

7. The portable cutting device of claim 6, wherein:
a step portion is provided on either the cap or the nozzle main body;
a step receiving portion is provided on the other of the cap and the nozzle main body; and
the fixing member is insertable into both the step portion and the step receiving portion to fix the cap to the dust collection nozzle.

8. The portable cutting device according to claim 3, wherein the dust collection nozzle includes an internal rib that extends parallel to the longitudinal axis.

9. The portable cutting device according to claim 8, wherein the internal rib is configured to be tilted upwards as it extends in a frontward-to-rearward direction when viewed in a direction transverse to the longitudinal axis.

10. A portable cutting device comprising:
a base with which a material to be cut is brought into contact; and
a cutting device main body that is supported on an upper surface side of the base;
the cutting device main body comprising:
an electric motor;
a rotary cutting blade that is driven by the electric motor;
a fixing cover that covers the rotary cutting blade above the upper surface side of the base;
a handle that a user holds; and
a dust collection nozzle (1) extending from the fixing cover, (2) located on an upper side of the base, (3) having a longitudinal axis that extends only in a direction perpendicular to side surfaces of the rotary cutting blade and (4) including an internal rib that extends parallel to the longitudinal axis; wherein:
the handle (1) includes a holding portion extending in an up-to-down direction and (2) is in a loop shape;
when the cutting depth of the rotary cutting blade is set to a maximum, (1) the holding portion is configured to be positioned farthest behind a rear end of the base and (2) the internal rib is configured to be tilted upwards as the internal rib extends in a frontward-to-rearward direction when viewed in a direction transverse to the longitudinal axis; and
the handle extends approximately parallel to a surface of the rotary cutting blade with respect to an up-down rear-front plane, where a plane of the loop shape in the up-down rear-front plane and a circumferential surface plane of the rotary cutting blade are approximately parallel.

11. The portable cutting device according to claim 10, wherein the dust collection nozzle extends from a front portion of the fixing cover below an upper end of the motor, in a direction perpendicular to the rotary cutting blade.

12. The portable cutting device according to claim 11, wherein the entirety of the dust collection nozzle lies below the upper end of the motor.

* * * * *